(12) United States Patent
Takeda et al.

(10) Patent No.: US 11,910,385 B2
(45) Date of Patent: Feb. 20, 2024

(54) CONTROL CHANNEL MONITORING CONFIGURATIONS FOR CROSS-CARRIER SCHEDULING

(71) Applicant: QUALCOMM INCORPORATED, San Diego, CA (US)

(72) Inventors: Kazuki Takeda, Tokyo (JP); Alberto Rico Alvarino, San Diego, CA (US); Peter Gaal, San Diego, CA (US); Wanshi Chen, San Diego, CA (US); Tao Luo, San Diego, CA (US); Jing Sun, San Diego, CA (US); Juan Montojo, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 17/448,701

(22) Filed: Sep. 23, 2021

(65) Prior Publication Data

US 2022/0110140 A1 Apr. 7, 2022

Related U.S. Application Data

(60) Provisional application No. 63/086,503, filed on Oct. 1, 2020.

(51) Int. Cl.
*H04W 72/1273* (2023.01)
*H04W 72/23* (2023.01)

(52) U.S. Cl.
CPC ....... *H04W 72/1273* (2013.01); *H04W 72/23* (2023.01)

(58) Field of Classification Search
CPC .......................... H04W 72/23; H04W 72/1273
(Continued)

(56) References Cited

U.S. PATENT DOCUMENTS

2019/0356524 A1* 11/2019 Yi ..................... H04L 27/26025
2022/0022067 A1* 1/2022 Kim ..................... H04W 24/08
(Continued)

OTHER PUBLICATIONS

International Search Report and Written Opinion—PCT/US2021/052020—ISA/EPO—dated Dec. 23, 2021.
(Continued)

*Primary Examiner* — Peter G Solinsky
(74) *Attorney, Agent, or Firm* — Haynes and Boone, LLP

(57) ABSTRACT

Mechanisms for cross-carrier scheduling from a first cell to a second cell in a wireless networking scheme are provided. In one aspect, a method for wireless communication includes: receiving, from a base station (BS), a first configuration for scheduling in a first cell, the first configuration comprising at least one of a first monitoring periodicity parameter or a first monitoring offset parameter associated with a search space in a second cell different than the first cell; receiving, from the BS, a second configuration for scheduling in the second cell, the second configuration comprising at least one of a different second monitoring periodicity parameter or a different second monitoring offset parameter associated with the search space in the second cell; and monitoring, in the search space in the second cell based on the first configuration and the second configuration, for downlink control information (DCI).

25 Claims, 12 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2022/0039072 A1* | 2/2022 | Babaei .............. | H04W 72/0446 |
| 2022/0109597 A1* | 4/2022 | Takeda ................ | H04L 27/2666 |
| 2023/0189180 A1* | 6/2023 | Yuan ................. | H04W 56/0045 |
| | | | 370/350 |

OTHER PUBLICATIONS

Nokia., et al: "Cross-Carrier Scheduling from SCell to PCell", 3GPP Draft; R1-2006469, 3rd Generation Partnership Project (3GPP), Mobile Competence Centre; 650, Route Des Lucioles; F-06921 Sophia-Antipolis Cedex; France, vol. Ran WG1, No. e-meeting; Aug. 17, 2020-Aug. 28, 2020, Aug. 7, 2020, XP051918040, 12 pages, Retrieved from the Internet: URL: https://ftp.3gpp.org/tsg_ran/WG1_RL1/TSGR1_102-e/Docs/R1-2006469.zip R1-2006469 R17-cross-cc.docx [retrieved on Aug. 7, 2020] p. 2-p. 10.

* cited by examiner

CONTROL CHANNEL MONITORING CONFIGURATIONS FOR CROSS-CARRIER SCHEDULING

CROSS-REFERENCE TO RELATED APPLICATIONS

This present application claims priority to and the benefit of U.S. Provisional Patent Application No. 63/086,503, filed Oct. 1, 2020, the entirety of which is incorporated by reference.

TECHNICAL FIELD

This application relates to wireless communication systems, and more particularly to downlink control information (DCI) monitoring configurations for cross-carrier scheduling in a carrier aggregation system.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Carrier aggregation (CA) is a capability, for example, in LTE and 5G NR, in which two or more frequency bands or component carriers (CCs) can be combined to increase bandwidth. In some aspects, one CC may be used as an anchor carrier or a primary cell (Pcell) and another CC may be used as a supplemental carrier or a secondary cell (Scell). The Scell may include an uplink (UL) component carrier and a downlink (DL) component carrier. Alternatively, the Scell may include a DL component carrier only. In CA communication scenarios, cross-carrier scheduling may be used, whereby the UE monitors for downlink communication information (DCI) (e.g., downlink (DL) scheduling grants) on one cell (e.g., Pcell) and receives downlink data (e.g., in a physical downlink shared channel (PDSCH)) on another cell (e.g., Scell). Additionally or alternatively, the UE may monitor for the DCI (e.g., uplink (UL) scheduling grants) on one cell and transmit UL data (e.g., in a physical uplink shared channel (PUSCH)) on another cell.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

According to one aspect of the present disclosure, a method of wireless communication performed by a user equipment (UE) includes: receiving, from a base station (BS), a first configuration for scheduling in a first cell, the first configuration comprising at least one of a first monitoring periodicity parameter or a first monitoring offset parameter associated with a search space in a second cell different than the first cell; receiving, from the BS, a second configuration for scheduling in the second cell, the second configuration comprising at least one of a second monitoring periodicity parameter or a second monitoring offset parameter associated with the search space in the second cell, wherein the at least one of the second monitoring periodicity parameter or the second monitoring offset parameter is different than the at least one of the first monitoring periodicity parameter or the first monitoring offset parameter; and monitoring, in the search space in the second cell based on the first configuration and the second configuration, for downlink control information (DCI).

According to another aspect of the present disclosure, a method of wireless communication performed by a base station (BS) includes: transmitting, to a user equipment (UE), a first configuration for scheduling in a first cell, the first configuration comprising at least one of a first monitoring periodicity parameter or a first monitoring offset parameter associated with a search space in a second cell different than the first cell; transmitting, to the UE, a second configuration for scheduling in the second cell, the second configuration comprising at least one of a second monitoring periodicity parameter or a second monitoring offset parameter associated with the search space in the second cell, wherein the at least one of the second monitoring periodicity parameter or the second monitoring offset parameter is different than the at least one of the first monitoring periodicity parameter or the first monitoring offset parameter; and transmitting, to the UE via the second cell based on the first configuration and the second configuration, downlink control information (DCI).

According to another aspect of the present disclosure, a UE includes a transceiver configured to: receive, from a base station (BS), a first configuration for scheduling in a first cell, the first configuration comprising at least one of a first monitoring periodicity parameter or a first monitoring offset parameter associated with a search space in a second cell different than the first cell; and receive, from the BS, a second configuration for scheduling in the second cell, the second configuration comprising at least one of a second monitoring periodicity parameter or a second monitoring offset parameter associated with the search space in the second cell, wherein the at least one of the second monitoring periodicity parameter or the second monitoring offset parameter is different than the at least one of the first monitoring periodicity parameter or the first monitoring offset parameter. The UE further includes a processor in communication with the transceiver and configured to monitor, in the search space in the second cell based on the first configuration and the second configuration, for downlink control information (DCI).

According to another aspect of the present disclosure, a BS includes a transceiver configured to: transmit, to a user equipment (UE), a first configuration for scheduling in a first cell, the first configuration comprising at least one of a first monitoring periodicity parameter or a first monitoring offset parameter associated with a search space in a second cell different than the first cell; transmit, to the UE, a second configuration for scheduling in the second cell, the second configuration comprising at least one of a second monitoring periodicity parameter or a second monitoring offset parameter associated with the search space in the second cell, wherein the at least one of the second monitoring periodicity parameter or the second monitoring offset parameter is different than the at least one of the first monitoring periodicity parameter or the first monitoring offset parameter; and transmit, to the UE via the second cell based on the first configuration and the second configuration, downlink control information (DCI).

According to another aspect of the present disclosure, a non-transitory computer-readable medium has program code recorded thereon. The program code includes: code for causing a user equipment (UE) to receive, from a base station (BS), a first configuration for scheduling in a first cell, the first configuration comprising at least one of a first monitoring periodicity parameter or a first monitoring offset parameter associated with a search space in a second cell different than the first cell; code for causing the UE to receive, from the BS, a second configuration for scheduling in the second cell, the second configuration comprising at least one of a second monitoring periodicity parameter or a second monitoring offset parameter associated with the search space in the second cell, wherein the at least one of the second monitoring periodicity parameter or the second monitoring offset parameter is different than the at least one of the first monitoring periodicity parameter or the first monitoring offset parameter; and code for causing the UE to monitor, in the search space in the second cell based on the first configuration and the second configuration, for downlink control information (DCI).

According to another aspect of the present disclosure, a non-transitory computer-readable medium has program code recorded thereon. The program code includes: code for causing a base station (BS) to transmit, to a user equipment (UE), a first configuration for scheduling in a first cell, the first configuration comprising at least one of a first monitoring periodicity parameter or a first monitoring offset parameter associated with a search space in a second cell different than the first cell; code for causing the BS to transmit, to the UE, a second configuration for scheduling in the second cell, the second configuration comprising at least one of a second monitoring periodicity parameter or a second monitoring offset parameter associated with the search space in the second cell, wherein the at least one of the second monitoring periodicity parameter or the second monitoring offset parameter is different than the at least one of the first monitoring periodicity parameter or the first monitoring offset parameter; and code for causing the BS to transmit, to the UE via the second cell based on the first configuration and the second configuration, downlink control information (DCI).

According to another aspect of the present disclosure, a UE includes: means for receiving, from a base station (BS), a first configuration for scheduling in a first cell, the first configuration comprising at least one of a first monitoring periodicity parameter or a first monitoring offset parameter associated with a search space in a second cell different than the first cell; means for receiving, from the BS, a second configuration for scheduling in the second cell, the second configuration comprising at least one of a second monitoring periodicity parameter or a second monitoring offset parameter associated with the search space in the second cell, wherein the at least one of the second monitoring periodicity parameter or the second monitoring offset parameter is different than the at least one of the first monitoring periodicity parameter or the first monitoring offset parameter; and means for monitoring, in the search space in the second cell based on the first configuration and the second configuration, for downlink control information (DCI).

According to another aspect of the present disclosure, a BS includes: means for transmitting, to a user equipment (UE), a first configuration for scheduling in a first cell, the first configuration comprising at least one of a first monitoring periodicity parameter or a first monitoring offset parameter associated with a search space in a second cell different than the first cell; means for transmitting, to the UE, a second configuration for scheduling in the second cell, the second configuration comprising at least one of a second monitoring periodicity parameter or a second monitoring offset parameter associated with the search space in the second cell, wherein the at least one of the second monitoring periodicity parameter or the second monitoring offset parameter is different than the at least one of the first monitoring periodicity parameter or the first monitoring offset parameter; and means for transmitting, to the UE via the second cell based on the first configuration and the second configuration, downlink control information (DCI).

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
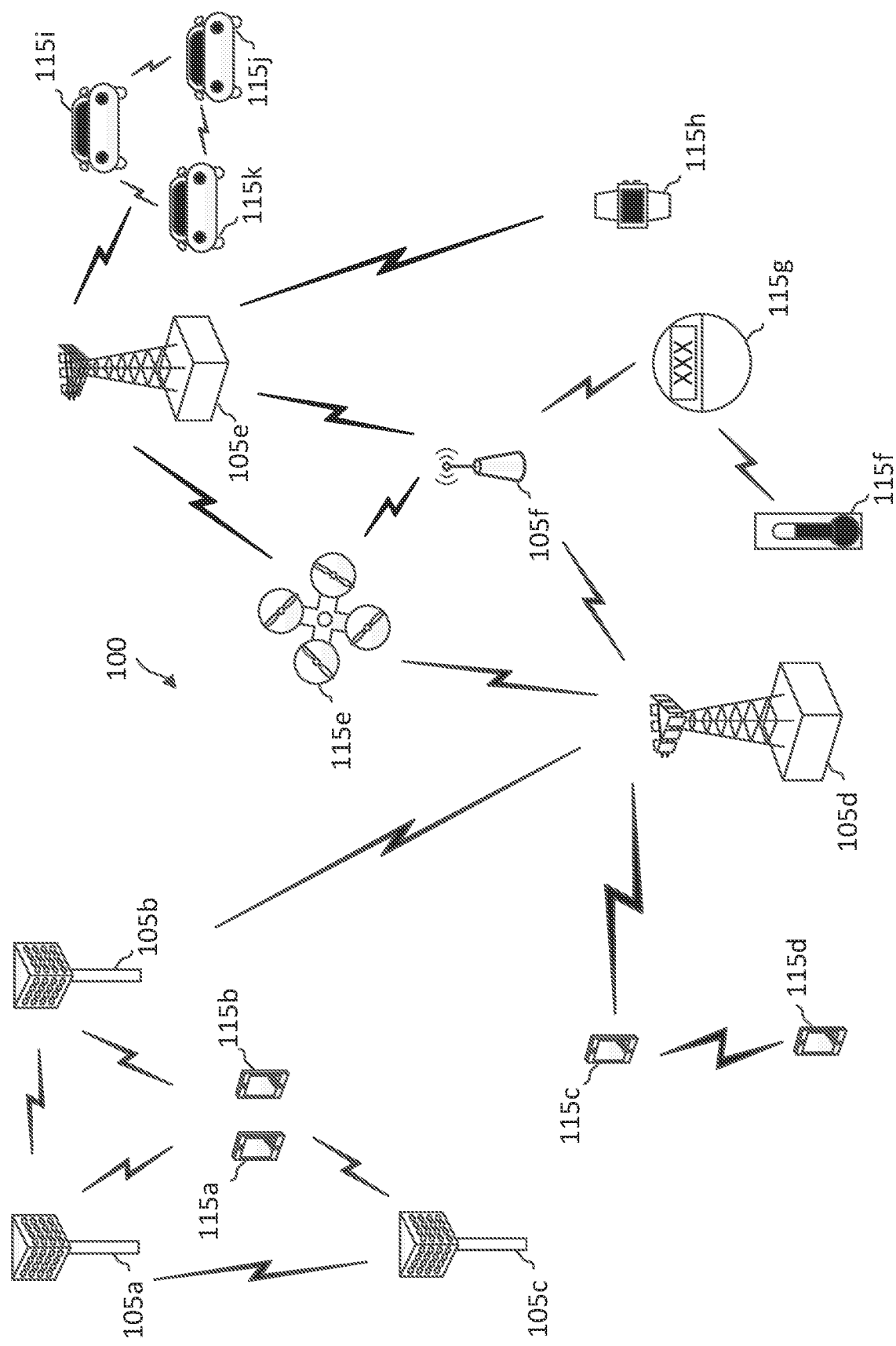
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless communication network, a BS may schedule a UE for UL communications and/or DL communications by transmitting UL scheduling grants and/or DL scheduling grants, respectively, to the UE. The UL scheduling grants and/or DL scheduling grants may be in the form of downlink control information (DCI). The BS may configure the UE with search spaces (time-frequency resource regions) where the BS may transmit UL and/or DL scheduling grants. Accordingly, the UE may monitor the search spaces for UL and/or DL scheduling grants from the BS. In some aspects, the BS may transmit DCI in a search space using various combination of resources in the search space (e.g., including control channel element (CCE) arrangements and/or aggregation level (AL)) within the search space, and the UE may perform blind decoding in the search space based on the resource configurations to detect for DCI. For example, the number of blind decoding that the UE may perform in a search space may correspond to the number of potential combinations that the BS may use for transmitting DCI in the search space. In some examples, a search space may repeat in time according to a certain periodicity. The BS may configure the UE with a monitoring configuration, for example, including DCI monitoring occasions corresponding to the time location of the search space, a monitoring periodicity corresponding to the periodicity of the search space, and/or a number of blind decodes corresponding to the number of potential combinations of resources.

In order to transfer data at a higher rate, a UE and a BS may communicate over multiple frequency bands in parallel (a form of carrier aggregation (CA)). In this configuration, one of the bands can be associated with a primary cell (Pcell) and another with a secondary cell (Scell). One or more of the Pcell or S cell may be used as a scheduling cell, in which a BS may transmit control channel information indicating scheduling grant or resource allocations (a location of DL/UL data resources) in another cell, referred to as the scheduled cell. In one example, the UE may monitor for DCI on a scheduling cell, where the DCI indicates that downlink data (e.g., in PDSCH) will be scheduled or transmitted on a scheduled cell. This may be referred to as "cross-carrier scheduling." In addition, the UE may also monitor for DCI on the scheduling cell for self-scheduling DL data on the scheduling cell.

As used herein, the term "cross-carrier scheduling" may refer to a BS transmitting a scheduling grant (DCI) in one cell for a schedule in another cell. As used herein, the term "self-scheduling" may refer to a BS transmitting a scheduling grant (DCI) in a cell for a schedule in the same cell. As used herein, the term "scheduling cell" may refer to a cell where a schedule is communicated. As used herein, the term "scheduled cell" may refer to a cell where a UL and DL communication is being scheduled. As used herein, the terms "search space" and "search space sets" may refer to a set of DCI candidates or physical downlink control channel (PDCCH) candidates where a UE may monitor for a scheduling grant (e.g., DCI).

In 5G NR, the scheduling cell and scheduled cell may be associated with different subcarrier spacings (SCSs). For example, if an Scell is the scheduling cell, the scheduling cell/Scell may have an SCS of 30 kHz, and the scheduled cell/Pcell may have an SCS of 15 kHz. The monitoring configuration (e.g., monitoring occasion frequency, number of blind decodes) used for identifying or scheduling DL/UL data may be based on the scheduling cell's SCS. In some instances, a BS may configure a DCI monitoring periodicity based on an SCS of a scheduling cell (where DCI is transmitted). For instance, a higher SCS may be associated with a higher monitoring occasion frequency compared to a lower SCS. When a CA system utilizing cross-carrier scheduling with a single scheduling cell, search spaces and/or DCI monitoring may be configured based on the SCS of the scheduling cell. For instance, a Pcell in the CS system may be a scheduling cell that provides schedules for the Pcell and one or more Scells in the CA system.

In some situations, it may be desirable to offload some of the scheduling operations to a Scell to ease traffic loading in the Pcell. However, Pcell is commonly used as anchor cell where system information is being communicated. Thus, the Pcell may also communicate scheduling information for communications in the Pcell. In other words, communications in the Pcell (the scheduled cell) may be based on schedules communicated in the Pcell and/or Scell. Thus, a UE may monitor for DCI in the Pcell as well as in the Scell for schedules to communicate in the Pcell. As discussed above, DCI monitoring periodicity may be dependent on the SCS of the scheduling cell. For instance, when scheduling from an Scell to the Pcell, where the Scell is associated with a higher SCS (e.g., 30 kHz) than the Pcell, the DCI monitoring parameters are based on the higher SCS, which may result in more frequent monitoring occasions compared to Pcell self-scheduling. However, DCI for the scheduled cell/Pcell may be transmitted based on the lower SCS of the scheduled cell such that the DCI may be transmitted less frequently than the DCI monitoring occasions for the higher SCS cell. Accordingly, when scheduling from a higher SCS cell to a lower SCS cell, the frequency of the monitoring occasions may be excessively frequent, resulting in less efficient use of cell resources and degraded user experience.

Aspects of the present disclosure provide mechanisms for monitoring for control channel information (e.g., DCI) using a search configuration in which one or more monitoring parameters (e.g., monitoring occasion frequency) used for monitoring in a scheduling cell (e.g., Scell) are based on an SCS of the scheduled cell (e.g., Pcell). In one aspect, a UE may be configured with different search space configurations to monitor for DCI in a search space of a scheduling cell for schedules to communicate in different scheduled cells. For example, aspects of the present disclosure provide for separate configurations of parameters such as monitoring periodicity and offset (monitoringSlotPeriodicityAndOffset), duration of the monitoring, and/or the symbol at which the monitoring starts within a given slot (monitoringSymbolsWithinSlot). Setting one or more of the monitoring parameters based on the scheduled cell's SCS may allow for sparser monitoring occasions when the scheduled cell's SCS is lower than the scheduling cell's SCS, thereby avoiding excessively frequent monitoring and enabling more efficient use of cell resources.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (HD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may be an NR network supporting carrier aggregation (CA) of component carriers (CCs) associated with various subcarrier spacings (SCSs). The network 100 may further support dynamic spectrum sharing (DSS) and cross-carrier scheduling between serving cells having different SCSs.

Figure 2:
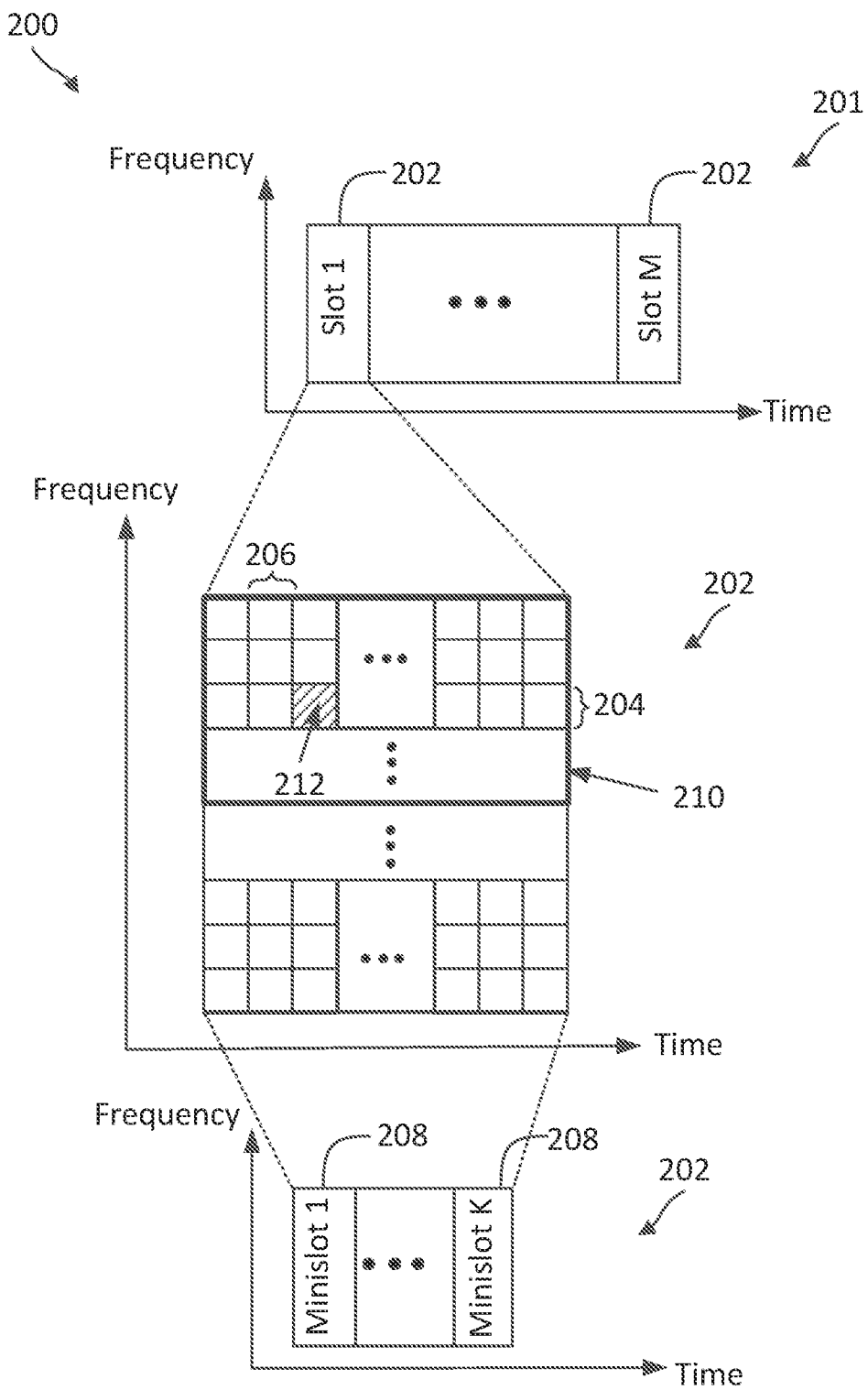
FIG. 2 illustrates a radio frame structure according to some aspects of the present disclosure.

FIG. 2 illustrates a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel BW, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N–1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
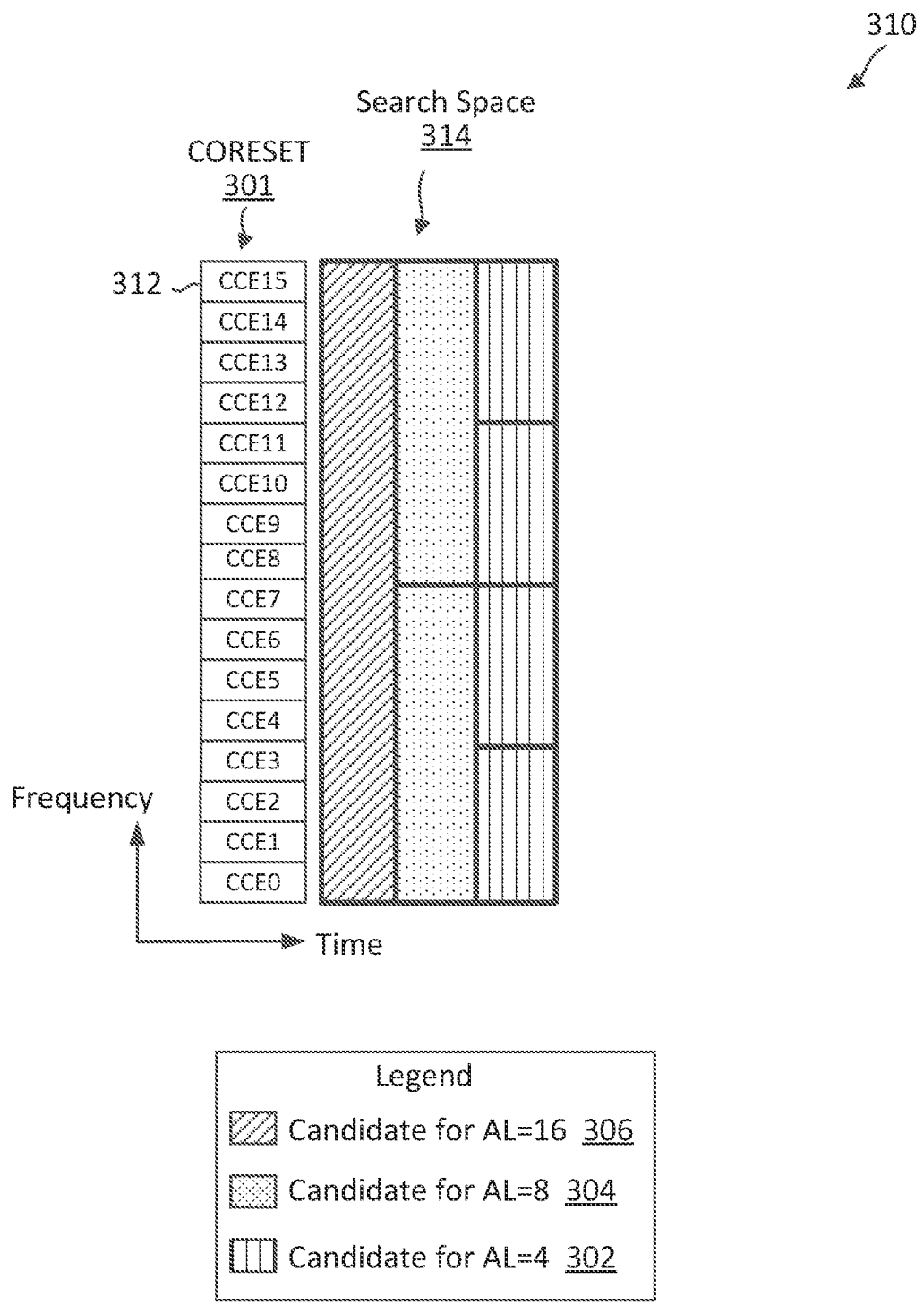
FIG. 3 illustrates a common control resource set (CORESET) blind detection scheme according to some aspects of the present disclosure.

FIG. 3 illustrates a common CORESET configuration scheme 300 according to some aspects of the present disclosure. The scheme 300 may be employed by BSs such as the BSs 105 and UEs such as the UEs 115 in a network such as the network 100 for communications. In particular, the BS may communicate PDCCH with a UE using time-frequency resources configured as shown in the scheme 300. The x-axis represent time in some arbitrary units, and the y-axes represent frequency in some arbitrary units.

A CORESET is a set of physical time-frequency resources where a BS (e.g., the BSs 105) may transmit PDCCH to provide scheduling information and/or any DL control information to UEs (e.g., the UEs 115) in a network (e.g., the network 100). Referring to FIGS. 2 and 3, a CORESET may span, for example, multiples of non-contiguous or contiguous groups of six RBs (e.g., the RBs 210) in frequency and between one to three contiguous OFDM symbols (e.g., the symbols 206) in time. In the time domain, a CORESET may be up to three OFDM symbols in duration and located anywhere within a slot (e.g., at a beginning of a slot). In the frequency domain, a CORESET may be defined in multiples of six RBs up to the system carrier frequency BW (e.g., a channel frequency BW).

Referring to FIG. 3, the CORESET 301 includes sixteen CCEs 312. The CCEs 312 may be indexed from 0 to 15 (shown as CCE1 to CCE15). The CORESET 301 is a CORESET #0. Each CCE 312 include six resource element groups (REGs), where a REG is defined as on physical RB in one symbol. In some aspects, the CORESET 301 may span 96 RBs (e.g., RBs 210) with an SCS of 15 kHz in frequency and one symbol (e.g., the symbols 206) in time. In other words, each CCE 312 may span 6 RBs in frequency and one symbol in time. In some other aspects, the CORESET 301 may span 48 RBs with an SCS of 30 kHz in frequency and two symbols in time. In other words, each CCE 312 may span 3 RBs in frequency and 2 symbols in time.

A BS (e.g., the BSs 105) may transmit an RRC information element (e.g., MIB, SIB schedule) including a search configuration for a PDCCH search space 314 associated with the CORESET 301 using an aggregation of four CCEs 312, an aggregation of eight CCEs 312, or an aggregation of sixteen CCEs 312. The PDDCH search space is an instance of the CORESET in a certain slot. An aggregation of four CCEs 312 may be referred to as an aggregation level (AL) of 4. An aggregation of eight CCEs 312 may be referred to as an AL of 8. An aggregation of sixteen CCEs 312 may be referred to as an AL of 16. The higher the AL, the more redundancy and more frequency diversity can be provided by the PDCCH transmission, and thus the more robust the PDCCH transmission may be. A UE (e.g., the UEs 115) may monitor the search space 314 by performing blind decoding to search for a PDCCH candidate in the search space 314 based on an aggregation level (AL) of 4, 8, or 16. The PDCCH monitoring for SIB scheduling is a PDCCH type-0 monitoring. In some aspects, as part of the PDCCH blind decoding, a UE may decode one candidate for an AL of 16, two candidates for an AL of 8, and four PDCCH candidates for an AL of 4 in the PDCCH search space. In some aspects, the PDCCH candidates in a CORESET 301 are mapped to the CCEs 312 as shown below:

$$L \times \left\{ \left\lfloor \frac{m \times N_{CCE}}{L \times M_{max}^{(L)}} \right\rfloor \mod \left\lfloor \frac{N_{CCE}}{L} \right\rfloor \right\} + i, \quad (1)$$

where $N_{CCE}$ represents the number of CCEs 312 in the CORESET 301, L represents the AL, i may vary from 0 to L−1, and $M_{max}^{(L)}$ represents the maximum number of PDCCH candidates for a certain AL. According to equation (1), the candidate 302 of AL 16 is mapped to CCEs 312 indexed 0 to 15, the two candidates 304 are mapped to CCEs 312 indexed 0 to 7 and CCEs 312 indexed 8 to 15, and the four candidates 306 are mapped to CCEs 312 indexed 0 to 3, CCEs 312 indexed 4 to 7, CCEs 312 indexed 8 to 11, and CCEs 312 indexed 12 to 15.

Figure 4:
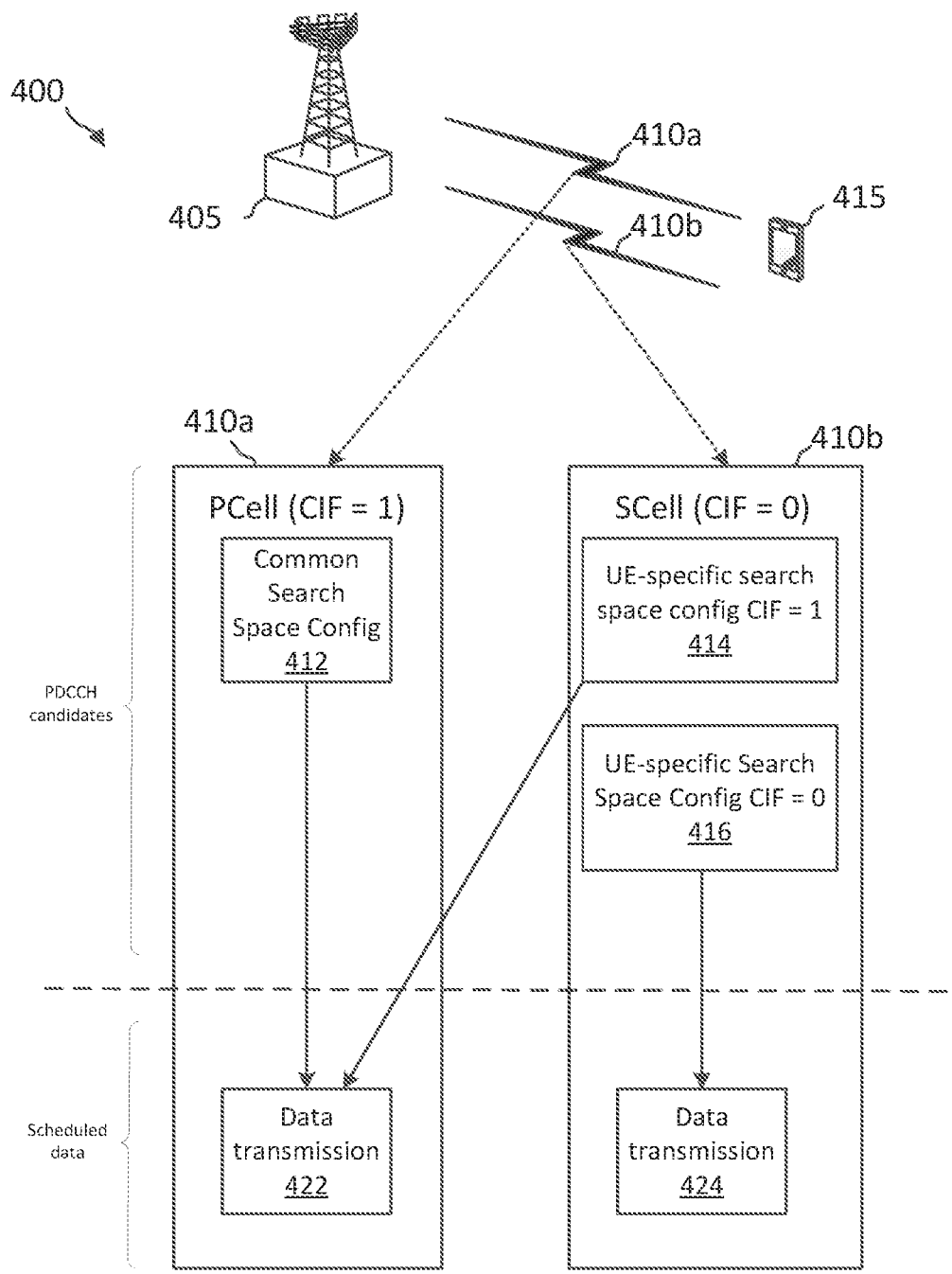
FIG. 4 illustrates a cross-carrier scheduling scheme according to some aspects of the present disclosure.

FIG. 4 is a diagram of a cross-carrier scheduling scenario 400 performed by a BS 405 and a UE 415. The BS 405 may be one of the BSs 105, and the UE 415 may be one of the UEs 115 in the network 100. The BS 405 and the UE 415 communicate using a carrier aggregation (CA) scheme such that the UE 415 can receive DL data and/or transmit UL data on two different serving cells: a first cell 410a and a second cell 410b. In FIG. 4, the first cell 410a is a primary cell (Pcell), and the second cell 410b is a secondary cell (Scell), where the Pcell and Scell are different frequency carriers. The BS 405 may schedule the UE 415 via the first cell 410a for communications in the first cell 410a (self-scheduling). The BS 405 may also schedule the UE 415 via the second cell 410a for communications in the first cell 410a (cross-carrier scheduling). For instance, the BS 405 may configure one or more DCI search spaces (including PDCCH candidates similar to the search space 314) in each of the first cell 410a and second cell 410b. For instance, the BS 405 may configure the UE with a search space configuration for each search space. In the illustrated example, the BS 405 may configure the UE 415 with a common search space (including PDCCH candidates similar to the search space 314) in the first cell 410a and two UE-specific search spaces (including PDCCH candidates) in the second cell 410b. A commons search space may refer to a search space for monitoring by a group of UEs. A UE-specific search space may refer to a search space for monitoring by a specific UE. For instance, the BS 405 may configure UE 415 with a common search space configuration 412 for monitoring the common search space in the first cell 410a, and UE-specific search space configurations 416 for monitoring the UE-specific search spaces in the second cell 410b. Accordingly, the UE 415 monitors for DCI in each of the first cell 410a and the second cell 410b using corresponding search space configurations 412, 414, 416. The first and second cells 410a, 410b are associated with respective carrier indicator fields (CIFs) (e.g., CIF=1 for the first cell 410a, CIF=0 for the second cell 410b). In the first cell 410a, the UE 415 monitors for DCI by attempting to decode one or more PDCCH candidates using a common search space configuration 412. The UE 415 may be configured with the common search space configuration for the first cell 410a by receiving an RRC information element (e.g., a SIB) from the BS 405 indicating the common search space configuration 412. The BS 405 may determine the common search space configuration 412 based on an SCS of the first cell 410a. In the illustrated example, the SCS of the first cell 410a may be 15 kHz. As will be further explained below, the search space configurations used by the UE 415 may indicate a monitoring occasion periodicity, a duration of the monitoring occasions, an offset of the monitoring occasions, or any other suitable monitoring parameter. Accordingly, the UE 415 may monitor for DCI in a search space in the first cell 410a based on the parameters of the common search space configuration 412. In response to identifying/decoding the DCI, the UE 415 may detect DL data and/or schedule UL data (Data transmission 422) on the first cell 410a based on scheduling information provided in the DCI. In some aspects, DCI for cross-carrier scheduling may include a UL or DL communication schedule and a CIF to indicate a cell (or carrier) where the communication is being scheduled.

The UE 415 also monitors for DCI in the second cell 410b. The UE 415 is configured with two UE-specific search space configurations 414, 416 for the second cell 410b. One or both of the UE-specific search space configurations 414, 416 may be associated with the SCS of the second cell 410b. In the illustrated example, the SCS of the second cell 410b may be 30 kHz. A first UE-specific search space configuration 414 for the Pcell (CIF=1) includes a first set of monitoring parameters, such as monitoring occasion periodicity, a duration of the monitoring occasions, an offset of the monitoring occasions, or any other suitable monitoring parameter. The UE 415 monitors for DCI in a first search space (configured by the configuration 414) within the second cell 410b based on the parameters of the first UE-specific search space configuration 414. In response to identifying/decoding the DCI, the UE 415 may receive DL data, and/or transmit UL data (data transmission 422) in the first cell 410a based on scheduling information provided in the DCI. Accordingly, it will be understood that the data transmission 422 can potentially be scheduled be either the Pcell 410a or the Scell 410b.

A second UE-specific search space configuration 416 for the Scell (CIF=0) includes a second set of monitoring parameters, such as monitoring occasion periodicity, a duration of the monitoring occasions, an offset of the monitoring occasions, or any other suitable monitoring parameter. The UE 415 monitors for DCI in a second search space (configured by the configuration 416) within the second cell 410b based on the parameters of the second UE-specific search space configuration 416. In response to identifying/decoding the DCI, the UE 415 may receive DL data (e.g., data transmission 424) and/or transmit UL data in the second cell 410b (e.g., data transmission 422) based on scheduling information provided in the DCI. Accordingly, the UE 415 may monitor, in one serving cell (e.g., Scell 410b), for DCIs associated with the same serving cell and/or a different serving cell (e.g., Pcell 410a). In some aspects, UL resources may be available on the Pcell 410a, but not the Scell 410b. Further, in some aspects, DL data may be scheduled on both the Pcell 410a and the Scell 410b.

Figure 5A:
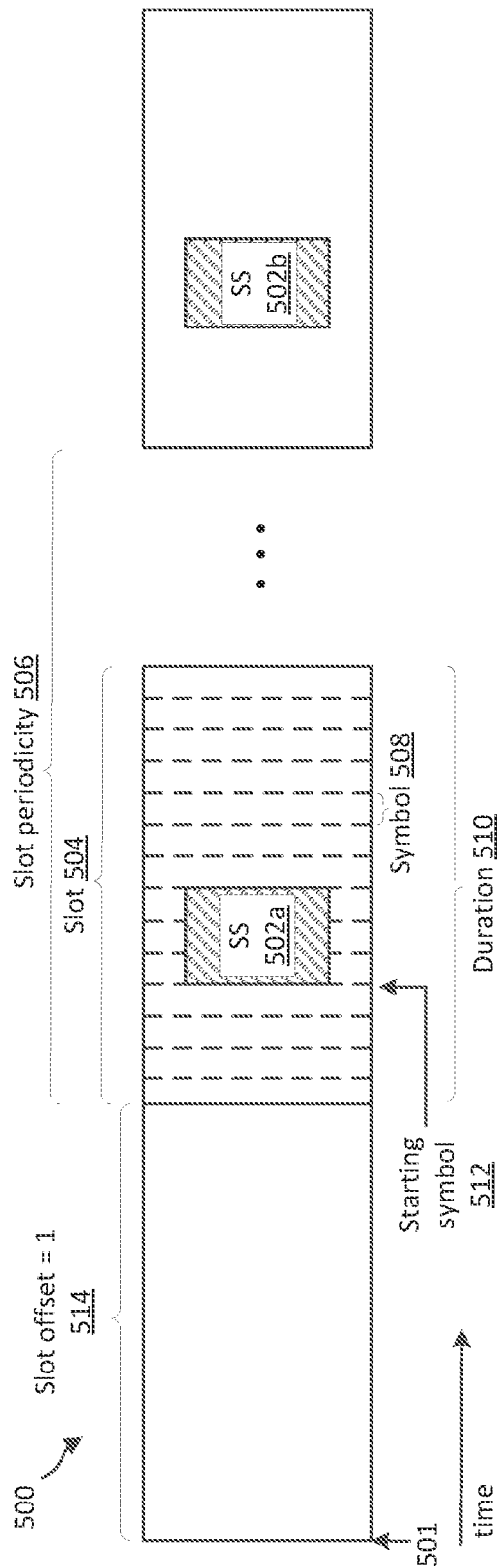
FIG. 5A is a timing diagram illustrating a control channel monitoring scheme according to some aspects of the present disclosure.
Figure 5B:
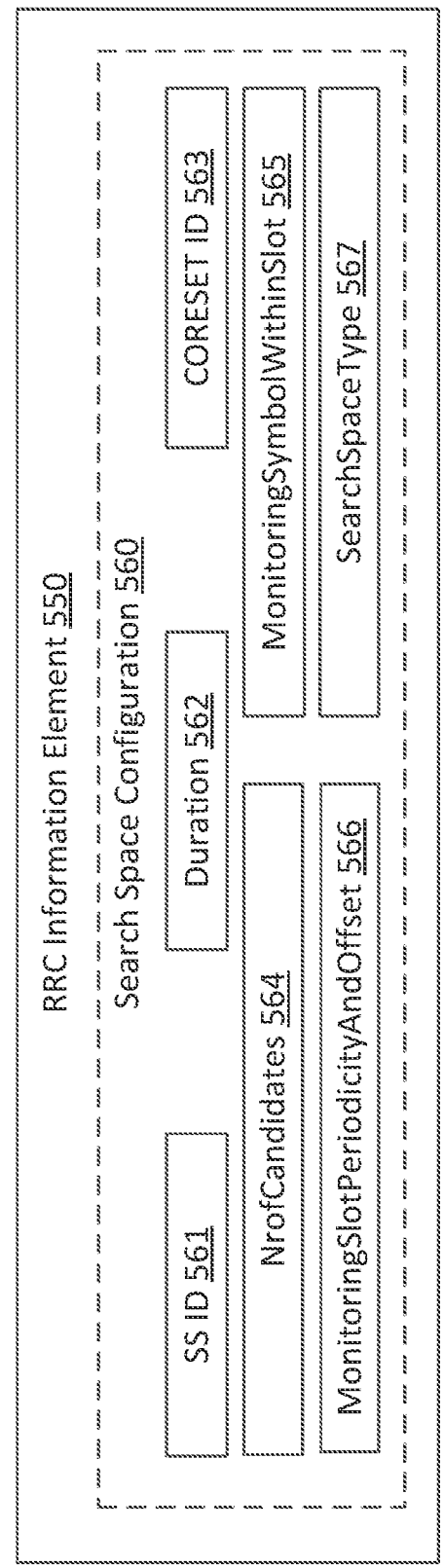
FIG. 5B illustrates a radio resource control (RRC) information element indicating a search space configuration according to some aspects of the present disclosure.

FIGS. 5A and 5B illustrate a search space configuration, according to some aspects of the present disclosure. In particular, FIG. 5A is a timing diagram illustrating a DCI monitoring scheme 500 using a search space configuration, and FIG. 5B illustrates components of an RRC information element 550 including a search space configuration 560. The scheme 500 may be employed by UEs such as the UEs 115, 415 in a network such as the network 100 for communications. The scheme 500 is performed based on parameters of the search space configuration 560.

Referring to FIG. 5A, the DCI monitoring scheme 500 includes a UE (e.g., a UE 115 or 415) periodically monitoring for PDCCH candidates from a BS, such as one of the BSs 105, 405, within search spaces 502 (shown as 502a and 502b). The search spaces 502a and 502b may correspond to a search space (e.g., the search space 314) associated with a CORESET (e.g., the CORESET 301) that repeats in time. For instance, the search spaces 502a, 502b are based on various periodicity and timing parameters, including a slot periodicity 506, a slot offset 514, a starting symbol 512, and other parameters. In the illustrated embodiment, the DCI monitoring scheme 500 is configured with a slot offset 514 of 1 slot from a reference time 501 (e.g., a start of a radio frame 201). The slots 504 may be indexed (e.g., from 0 to 9, 0 to 19). The first search space 502a occurs in a second slot 504, with a slot index 1 in a given radio frame. In some aspects, the slot offset 514 may be set based on a monitoringSlotPeriodicityAndOffset parameter 566 indicated in the search space configuration 560.

Each slot 504 includes a plurality of symbols 508. In FIG. 5A, each slot 504 has 14 symbols, with indices ranging from 0 to 13. However, other configurations are also possible, including slots having seven symbols, for example.

The search spaces 502a occur every N slots, where N is an integer associated with a slot periodicity 506. In some aspects, N may be 1, 2, 3, 4, 5, 7, 10, or any other suitable integer, both greater or smaller. The slot periodicity 506 may be set based on the monitoringSlotPeriodicityAndOffset parameter 566 indicated in the search space configuration 560. In some aspects, the slot periodicity 506 may be based on or associated with an SCS of the scheduling/monitoring cell. In some aspects, a serving cell having a higher SCS (e.g., 30 kHz, 120 kHz), may be configured with a smaller slot periodicity, such that monitoring occasions are more frequent compared to monitoring occasions in a cell having a lower SCS (e.g., 15 kHz).

The search spaces 502a, 502b begin at a starting symbol 512 within the slot 504. The starting symbol 512 may be set based on a monitoringSymbolWithinSlot parameter 565 indicated in the search space configuration 560. The starting symbol 512 may be based on or associated with an SCS of the scheduling/monitoring cell, in some aspects.

The search spaces 502a, 502b may be associated with a monitoring occasion duration 510, which indicates a number of consecutive slots where the search spaces 502 may be present. In some aspects, the duration 510 is N slots, where N is an integer. In the illustrated example, N is 1. The duration may be set or based on a parameter of the search space configuration 560.

In some aspects, the RRC information element 550 may be transmitted by the BS to the UE as part of system information (e.g., in a MIB to provide SIB scheduling information), as part of an initial network access procedure, or as part of normal operation, in some aspects. The search space configuration 560 includes other parameters, such as a search space identifier 561, a duration 562, a CORESET ID 563, a NrOfCandidates parameter 564, and a search space type parameter 567. In some aspects, a BS may configure a UE up to about three CORESETs and up to about ten search spaces, each instantiated from one of the CORESETs.

In some aspects, a BS may configure a UE with one active BWP at any given time for each of the Pcell or Scell. The BS may transmit an RRC message to the UE including a BWP configuration for communications over a certain BWP, for example, in the Pcell. The BWP configuration may include one or more search configurations similar to the search space configuration 560s providing the UE with DCI monitoring occasions for scheduling transmissions in the BWP of the Pcell. Similarly, the BS may configure the UE with an active BWP in the Scell using similar mechanisms.

Figure 6:
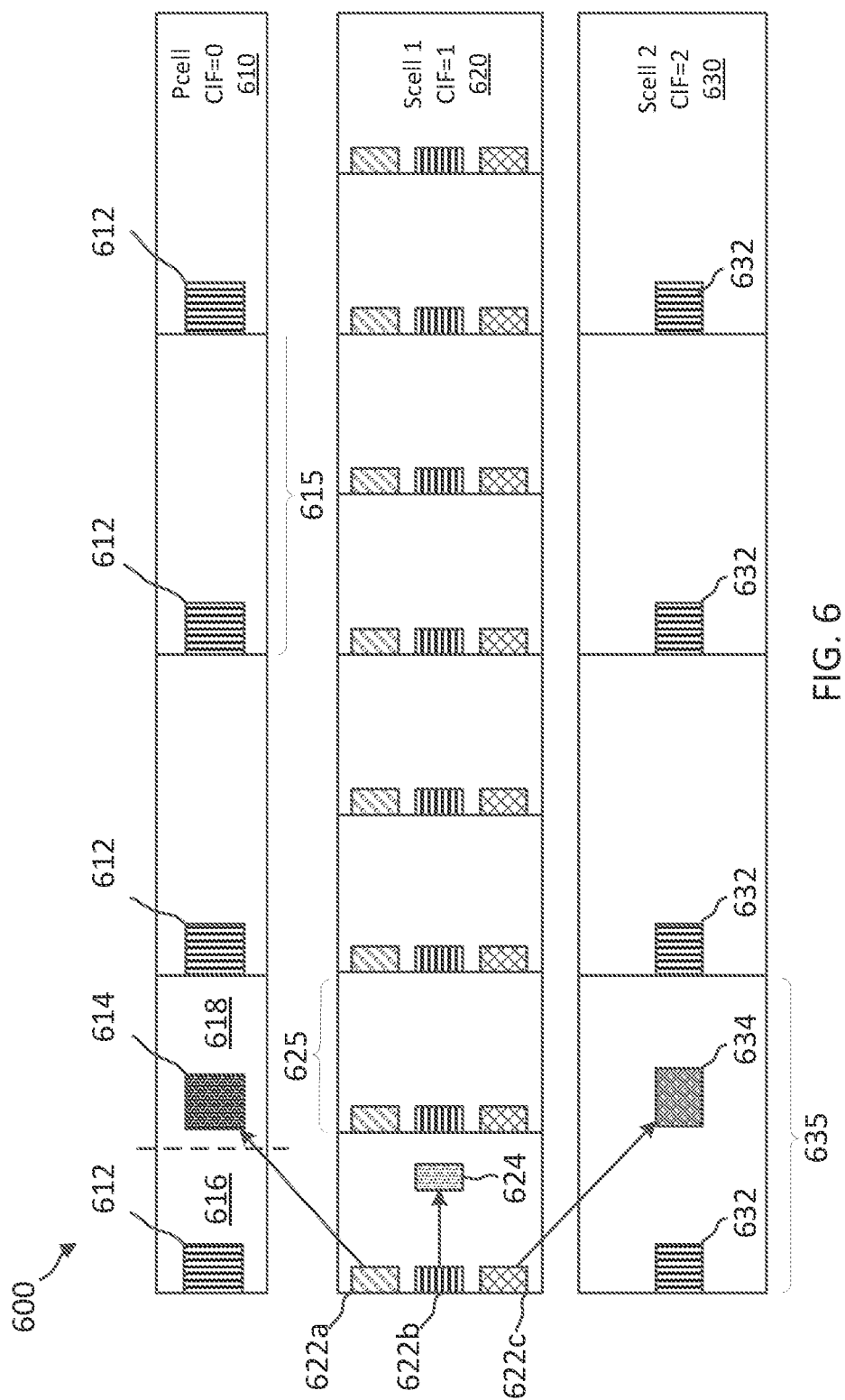
FIG. 6 is a timing diagram illustrating a control channel monitoring scheme in a cross-carrier scheduling scenario according to some aspects of the present disclosure.

FIG. 6 illustrates a cross-carrier scheduling scheme 600 according to aspects of the present disclosure. The scheme 600 may be employed by UEs such as the UEs 115, 415 in a network such as the network 100 for communications. In FIG. 6, the x-axis represents time in some arbitrary units. The scheme 600 may be performed based on parameters of the search space configuration 560 indicated in the RRC information element 550 described above in FIG. 5B. Referring to FIG. 6, a UE, such as one of the UEs 115 or 415, may be connected to a BS, such as one of the BSs 105 or 405, via multiple serving cells. In the illustrated scenario, the UE is connected to the BS via a Pcell 610 (CIF=0), a first Scell 620 (CIF=1), and a second Scell 630 (CIF=2). In the illustrated scheme 600, a BS may configure a UE to monitor for DCI (scheduling grants) in the first Scell 620 that schedules DL data (e.g., in a PDSCH) and/or UL data (e.g., in a PUSCH) in the Pcell 610, first Scell 620, and/or the second Scell 630. The BS may also configure the UE to monitor for DCI (scheduling grants) in the Pcell 610 that self-schedules DL data in the Pcell 610. Accordingly, the BS may transmit a scheduling grant (DCI) in the Pcell 610 to schedule the UE for a communication in the Pcell 610. The BS may also transmit a scheduling grant (DCI) in the Scell 620 to schedule the UE for a communication in the Pcell 610, the Scell 620, or the Scell 630. For instance, the BS may configure a search space 612 (a set of physical time-frequency resources) in the Pcell 610 for scheduling communications in the Pcell 610. The BS may configure a search space 622 (a set of physical time-frequency resources) in the Scell 620 for scheduling communications in the Pcell 610, the Scell 620, and the Scell 630. Within the search space 622, a certain set of PDCCH candidates or DCI candidates (shown as 622a) may be used for scheduling the Pcell 610, a certain set of PDCCH candidates or DCI candidates (shown as 622b) may be used for scheduling the Scell 620, and a certain set of PDCCH candidates or DCI candidates (shown as 622c) may be used for scheduling the Scell 620. Thus, although FIG. 6 illustrates separate search spaces 622a, 622b, and 622c carrying DCI for scheduling the different Pcell 610, Scell 620, and Scell 630, it will be understood that the search spaces 622a 622b, 622c can correspond to a single search space instantiated from a single CORESET and identified by the same search space ID. In particular, each of the search spaces 622a, 622b, 622c may correspond to a different set of PDCCH candidates within a single search space. The UE may monitor for DCI in the PDCCH candidates of the search space for schedules associated with the different Pcell 610, Scell 620, and Scell 630 and may differentiate schedules for the different Pcell 610, Scell 620, and Scell 630 based on the CIF in the detected DCI.

Further, the BS may configure the UE with a fifth search space configuration indicating a search space 632 in the Scell 630. The fifth search space configuration may include a slot periodicity 635, a slot offset, a duration, and any other suitable search space configuration parameter. Accordingly, the UE monitors for DCI in the search spaces 632 in accordance with the fifth search space configuration. In some aspects, the BS may transmit the fifth search space configuration to the UE via the Scell 630. In an exemplary embodiment, the search space 632 in the Scell 630 is a common search space and the first search space configuration is a common search space configuration.

The BS may configure the UE with a first search space configuration indicating a search space 612 in the Pcell 610. The first search space configuration may include a slot periodicity 615, a slot offset, a duration, and any other suitable search space configuration parameter. Accordingly, the UE monitors for DCI in the search spaces 612 in accordance with the first search space configuration. In some aspects, the BS may transmit the first search space configuration to the UE via the Pcell 610. In an exemplary embodiment, the search space 612 in the Pcell 610 is a common search space and the first search space configuration is a common search space configuration.

The BS may also configure the UE with a second search configuration (for cross-carrier scheduling) indicating the search space 622a (where scheduling grants for the Pcell 610 may be transmitted) in the Scell 620. In some aspects, the second search space configuration for cross-carrier scheduling may indicates only a number of candidates (e.g., nrofCandidates), and all other fields of the second search space configuration are absent. All the other fields (e.g., monitoring periodicity, monitoring offset, monitoring symbol within slot, and/or duration, etc.) may be based on a search space configuration for self-scheduling in the Scell 620. For instance, the BS may transmit a third search space configuration (via the Scell 620) indicating the search space 622b for self-scheduling in the S cell 620, the third search configuration may provide all the other fields that were absent in the second search space configuration. Further, the BS may transmit a fourth search configuration (via the Scell 630) indicating the search space 622c for scheduling communications in the Scell 630. Again, the fourth search configuration (for cross-carrier scheduling) may indicate only a number of candidates (e.g., nrofCandidates), and all other fields of the fourth search space configuration may be absent.

In the illustrated embodiment, the slot periodicity 615 of the DCI monitoring on the Pcell 610 is one, such that a search space or monitoring occasion occurs in every slot. However, other slot periodicities, offsets, and other parameters are contemplated, including slot periodicities of 2, 3, 4, 5, 10, or any suitable number, both greater or smaller. Each slot in the Pcell 610 has a DCI search region 616 and a scheduling region 618. The DCI search region 616 may be in a CORESET or control region in which the UE performs blind decoding for one or more search candidates to detect DCI. The scheduling region 618 may be used for scheduled DL data (e.g., PDSCH) and/or UL data (e.g., PUSCH), based on information provided by the decoded DCI. Although FIG. 6 illustrates the slot being partitioned into the DCI search region 616 and the scheduling region 618 in time, it should be understood that in other examples a slot may be partitioned into a DCI search region and a scheduling region in any suitable manner in time and/or frequency.

The UE monitors for DCI with three different sets of search spaces 622a, 622b, 622c, each set of search spaces associated with a different scheduled cell. In this regard, a first set of search spaces 622a is associated with scheduling on the Pcell 610, a second set of search spaces 622b is associated with self-scheduling on the first Scell 620, and a third set of search spaces 622c is associated with scheduling on the second Scell 630. In the illustrated embodiment, the BS may configure the UE with a single set of monitoring periodicity and/or slot offset parameters for the search space 622. In other words, each set of search spaces 622a, 622b, 622c for monitoring schedules for the Pcell 610, the Scell 620, and the Scell 630 is based on the same search space configuration (e.g., the third search space configuration). In that regard, the search space configuration may be based on or associated with the SCS of the scheduling cell, which is the first Scell 620, in this instance. The UE may monitor for DCI in the search space 622a, 622b, and 622c, for schedules for the Pcell 610, the Scell 620, and the Scell 630, respectively.

If DCI with CIF=0 is detected in a PDCCH candidate of the first set of search spaces 622a, the UE may determine that DL data 614 has been scheduled on the Pcell 610. The UE may then identify or detect the DL data 614 based on the information provided by the decoded DCI. In other embodiments, the UE may schedule UL data (e.g., PUSCH) on the Pcell 610 according to a UL grant indicated in the decoded DCI.

If DCI with CIF=1 is detected in a PDCCH candidate of the second set of search spaces 622b, the UE may determine that DL data 624 has been scheduled on the first Scell 620. The UE may then identify or detect the DL data 624 based on the information provided by the decoded DCI.

If DCI with CIF=2 is detected in a PDCCH candidate of the third set of search spaces 622c, the UE may determine that DL data 634 has been scheduled on the second Scell 630. The UE may then identify or detect the DL data 634 based on the information provided by the decoded DCI. In FIG. 6, the search spaces 622a, 622b, 622c occur with a slot periodicity 625 of once each slot. However, as described above, other slot periodicities are also contemplated. The search spaces 622 performed on the second Scell 630 also occur with a slot periodicity 635 of once each slot. The DCI monitoring performed on the second SCell 630 may be performed based on a common search space configuration, in some aspects. Although the slot periodicities 615, 625, 635 are each one search space per slot in FIG. 6, the time length of each slot may differ based on the SCS of each serving cell. For example, the SCS of the first Scell 620 may be higher than the SCS of the Pcell 610 and/or second Scell 630. Accordingly, the time duration of the slots in the frame structure of the first Scell 620 may be shorter than the time duration of the slots on the Pcell 610 and/or second Scell 620. Additionally, or alternatively, in other aspects, the slot periodicity of the scheduling cell (first Scell 620) may differ from the slot periodicity of one or more of the scheduled cells (Pcell 610, second Scell 630).

In the configuration illustrated in FIG. 6, the same search space configuration is used by the scheduling cell for self-scheduling and cross-carrier scheduling, without regard to the SCS of the scheduled cell. However, the BS may transmit DCI with a periodicity corresponding to the scheduled cell's SCS (or slot duration). Accordingly, in some aspects, the UE may perform DCI monitoring more frequently than the BS transmits DCI, resulting in a suboptimal use of time/frequency resources of the scheduling cell. Aspects of the present disclosure describe mechanisms for using different search space configurations on a scheduling cell for self-scheduling and cross-carrier scheduling communication scenarios.

Figure 7:
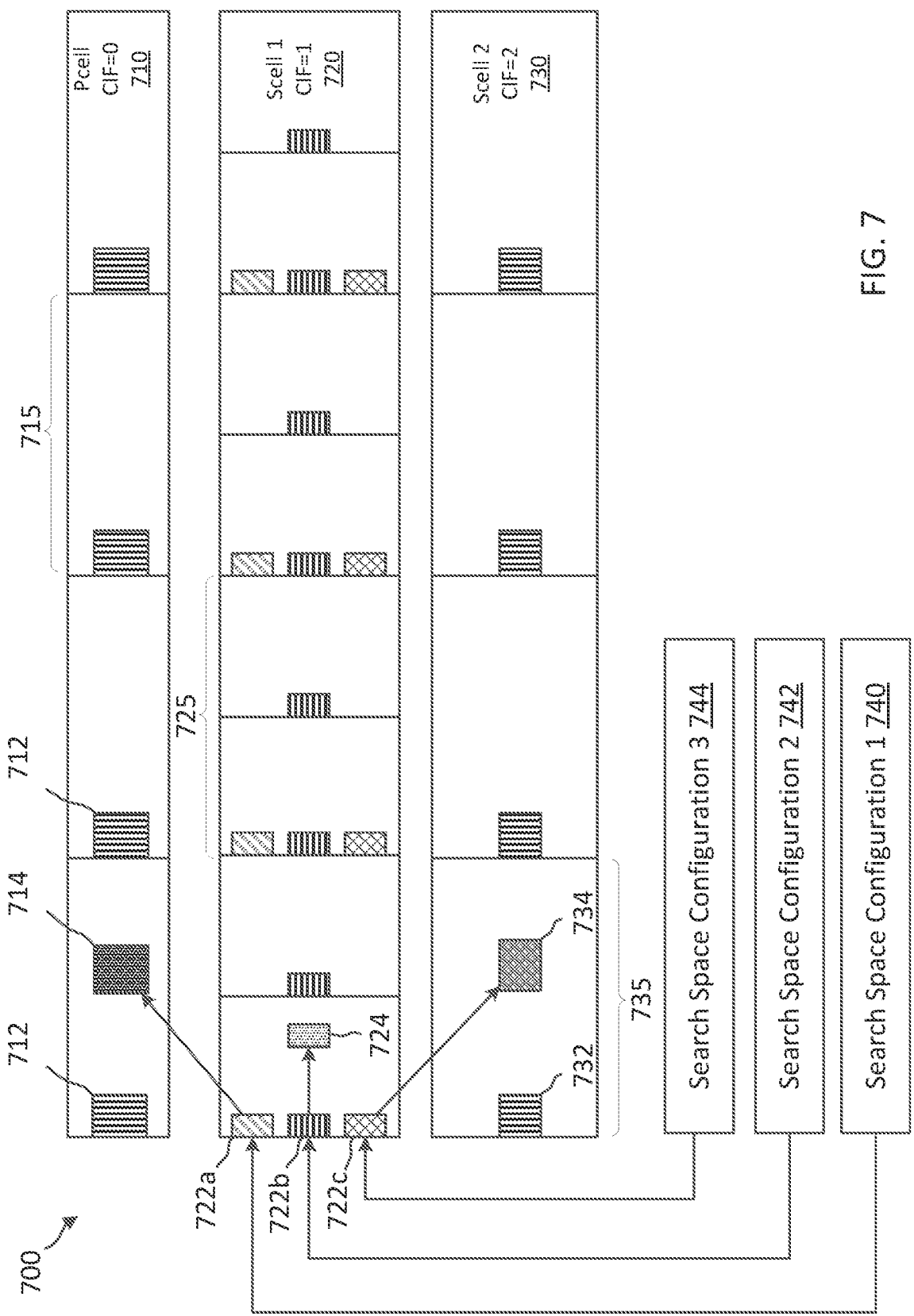
FIG. 7 is a timing diagram illustrating a control channel monitoring scheme in a cross-carrier scheduling scenario according to some aspects of the present disclosure.

FIG. 7 illustrates a cross-carrier scheduling scheme 700 according to aspects of the present disclosure. The scheme 700 may be employed by UEs such as the UEs 115, 415 in a network such as the network 100 for communications. The scheme 700 may be performed based on parameters of the search space configuration 560 indicated in the RRC information element 550 described above in FIG. 5B. Referring to FIG. 7, a UE, such as one of the UEs 115 or 415, may be connected to a BS, such as one of the BSs 105 or 405, via multiple serving cells. In the illustrated scenario, the UE is connected to the BS via a Pcell 710 (CIF=0), a first Scell 720 (CIF=1), and a second Scell 730 (CIF=2). In the illustrated scheme 700, the first Scell 720 is configured to identify or schedule DL (e.g., PDSHC) and/or UL data (e.g., PUSCH) to the Pcell 710 and to the second Scell 730. The first Scell 720 is also configured to self-schedule DL data.

The UE monitors for DCI in search spaces 712. The Pcell 710 may be configured with a search space configuration, including a slot periodicity 715, a slot offset, a duration, and/or any other suitable search space configuration parameter. In one aspect, the search space 712 is a common search space. Further, the UE monitors for DCI in search spaces 732. The Scell 730 may be configured with a search space configuration, including a slot periodicity 735, a slot offset, a duration, and/or any other suitable search space configuration parameter. In one aspect, the search space 732 is a common search space The UE monitors for DCI in the first Scell 720 using three sets of search spaces 722a, 722b, and 722c associated with three search space configurations 740, 742, and 744. In this regard, a first set of search spaces 722a is associated with scheduling on the Pcell 710, a second set of search spaces 722b is associated with self-scheduling on the first Scell 720, and a third set of search spaces 722c is associated with scheduling on the second Scell 730. In contrast to the scheme 600 illustrated in FIG. 6, each set of search spaces 722a, 722b, 722c is performed using search space configurations associated with the SCS of the scheduled cell.

The UE monitors for DCI in the search space 722a using a first search space configuration 740. The first search space configuration 740 includes search space parameters associated with the SCS of the Pcell 710. Accordingly, as illustrated in FIG. 7, the slot periodicity parameter 725 of the first search space configuration 740 is one search space 722a every other slot such that the search spaces 722a occur with the same periodicity as the search spaces 712 used in the Pcell 710 DCI monitoring. In that regard, it will be understood that the duration of a slot in a radio subframe for the higher SCS (e.g., 30 kHz) of the first Scell 720 may be half the duration of a slot in a radio subframe for the lower SCS (e.g., 15 kHz) of the Pcell 710. In this way, the search spaces 722a occur less frequently such that the periodicity of the search spaces 722a corresponds to the periodicity of the potential DCI transmissions. Accordingly, excessively frequent monitoring occasions are avoided for a more efficient use of cell resources.

If DCI with CIF=0 is detected in a PDCCH candidate of the first set of search spaces 722a, the UE may determine that DL data 714 has been scheduled on the Pcell 710. The UE may then identify or detect the DL data 714 based on the information provided by the decoded DCI. In other aspects, the UE may schedule UL data (e.g., PUSCH) on the Pcell 710 according to a UL grant indicated in the decoded DCI.

The UE monitors for DCI in the search space 722b using a second search space configuration 742. The second search space configuration 742 includes search space parameters associated with the SCS of the first Scell 720. Accordingly, the second set of search spaces 722b occur more frequently (a higher periodicity) relative to the first set of search spaces 722a. If DCI with CIF=1 is detected from a PDCCH candidate of the second set of search spaces 722b, the UE may determine that DL data 724 has been scheduled on the first Scell 720. The UE may then identify or detect the DL data 724 based on the information provided by the decoded DCI.

The UE monitors for DCI using a third search space configuration 744. The third search space configuration 744 includes search space parameters associated with the SCS of the second Scell 730. Accordingly, the third set of search spaces 722c is occurs less frequently than the second set of search spaces 722b. If DCI with CIF=2 is detected in a PDCCH candidate of the third set of search spaces 722c, the UE may determine that DL data 734 has been scheduled on the second Scell 730. The UE may then identify or detect the DL data 734 based on the information provided by the decoded DCI.

Figure 8:
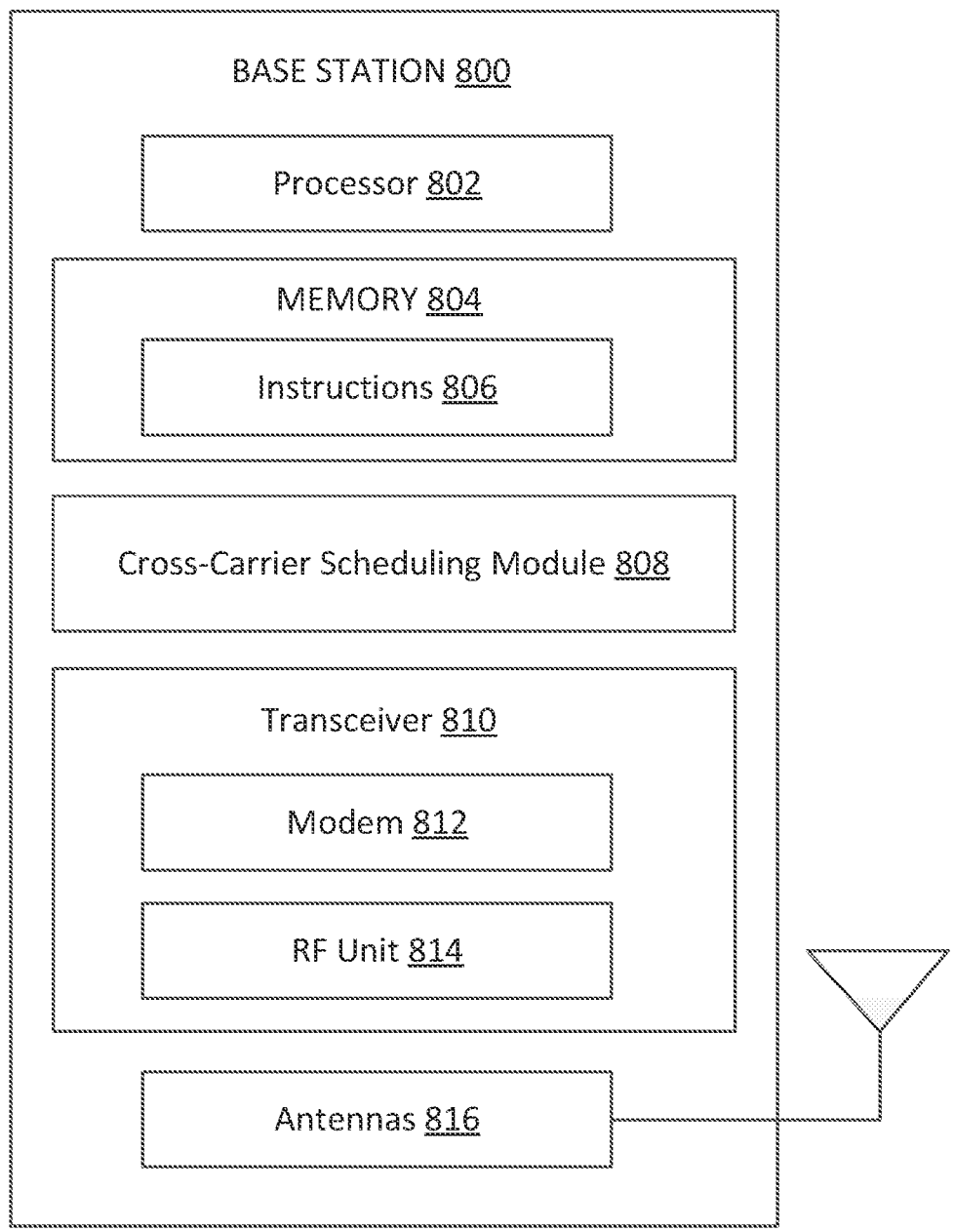
FIG. 8 is a block diagram of an exemplary base station (BS) according to some aspects of the present disclosure.

FIG. 8 is a block diagram of an exemplary BS 800 according to some aspects of the present disclosure. The BS 800 may be a BS 105 in the network 100 as discussed above in FIG. 1. A shown, the BS 800 may include a processor 802, a memory 804, a cross-carrier scheduling module 808, a transceiver 810 including a modem subsystem 812 and a RF unit 814, and one or more antennas 816. These elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 3-7, 10, and 12. Instructions 806 may also be referred to as program code. The program code may be for causing a wireless communication device to perform these operations, for example by causing one or more processors (such as processor 802) to control or command the wireless communication device to do so. The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may include a single computer-readable statement or many computer-readable statements.

The cross-carrier scheduling module 808 may be implemented via hardware, software, or combinations thereof. For example, the cross-carrier scheduling module 808 may be implemented as a processor, circuit, and/or instructions 806 stored in the memory 804 and executed by the processor 802. In some examples, the cross-carrier scheduling module 808 can be integrated within the modem subsystem 812. For example, the cross-carrier scheduling module 808 can be implemented by a combination of software components (e.g., executed by a DSP or a general processor) and hardware components (e.g., logic gates and circuitry) within the modem subsystem 812.

The cross-carrier scheduling module 808 may be used for various aspects of the present disclosure, for example, aspects of FIGS. 3-7, 10, and 12. The cross-carrier scheduling module 808 is configured to cause the transceiver 810 to transmit, to a UE, such as one of the UEs 115, 415, 900, a first configuration for scheduling in a first cell, the first configuration comprising at least one of a first monitoring periodicity parameter or a first monitoring offset parameter associated with a search space in a second cell different than the first cell. The cross-carrier scheduling module 808 is further configured to cause the transceiver 810 to transmit, to the UE, a second configuration for scheduling in the second cell, the second configuration comprising at least one of a second monitoring periodicity parameter or a second monitoring offset parameter. In some aspects, the at least one of the second monitoring periodicity parameter or the second monitoring offset parameter is different than the at least one of the first monitoring periodicity parameter or the first monitoring offset parameter.

As shown, the transceiver 810 may include the modem subsystem 812 and the RF unit 814. The transceiver 810 can be configured to communicate bi-directionally with other devices, such as the UEs 115 and/or another core network element. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., PDCCH, PDSCH, SSBs, SIBs, initial BWP configurations, PDCCH common configurations, search space configurations) from the modem subsystem 812 (on outbound transmissions) or of transmissions originating from another source such as a UE 115. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 105 to enable the BS 105 to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, transmission of information to complete attachment to a network and communication with a camped UE 115 according to some aspects of the present disclosure. The antennas 816 may further receive data messages transmitted from other devices and provide the received data messages for processing and/or demodulation at the transceiver 810. The transceiver 810 may provide the demodulated and decoded data (e.g., UE capability reports, MSG1, MSG3, ACK/NACK, PUCCH, PUSCH) to the cross-carrier scheduling module 808 for processing. The antennas 816 may include multiple antennas of similar or different designs in order to sustain multiple transmission links.

In some aspects, the processor 802 is configured to coordinate with the cross-carrier scheduling module 808 to transmit, to a UE on a scheduling cell having a first SCS, a search space configuration associated with a second SCS of a scheduled cell, and to transmit a DCI to the UE on the scheduling cell.

In an aspect, the BS 800 can include multiple transceivers 810 implementing different RATs (e.g., NR and LTE). In an aspect, the BS 800 can include a single transceiver 810 implementing multiple RATs (e.g., NR and LTE). In an aspect, the transceiver 810 can include various components, where different combinations of components can implement different RATs.

Figure 9:
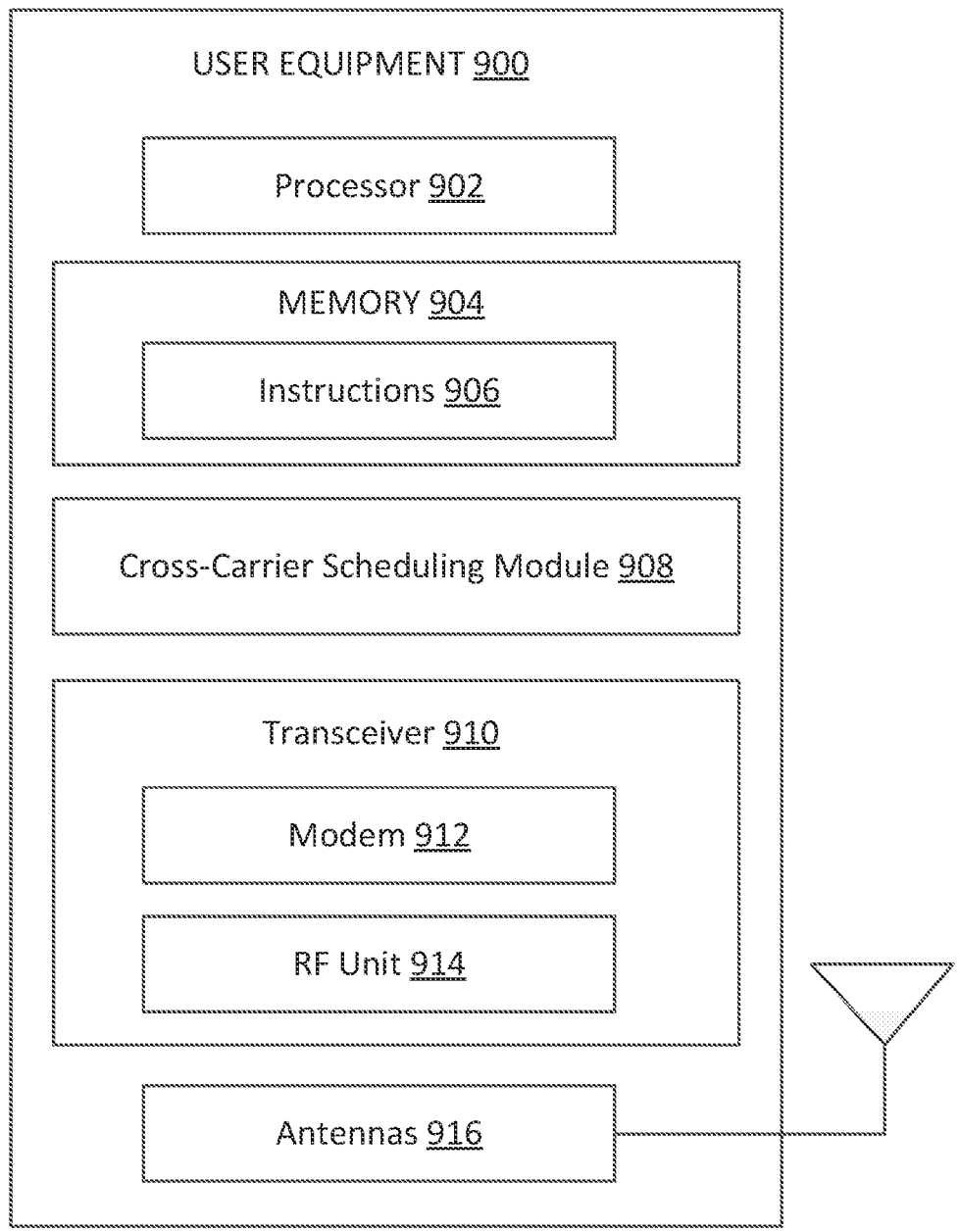
FIG. 9 is a block diagram of an exemplary user equipment (UE) according to some aspects of the present disclosure.

FIG. 9 is a block diagram of an exemplary UE 900 according to some aspects of the present disclosure. The UE 900 may be a UE 115 as discussed above with respect to FIG. 1. As shown, the UE 900 may include a processor 902, a memory 904, a cross-carrier scheduling module 908, a transceiver 910 including a modem subsystem 912 and a radio frequency (RF) unit 914, and one or more antennas 916. These elements may be in direct or indirect communication with each other, for example via one or more buses.

The processor 902 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 904 includes a non-transitory computer-readable medium. The memory 904 may store, or have recorded thereon, instructions 906. The instructions 906 may include instructions that, when executed by the processor 902, cause the processor 902 to perform the operations described herein with reference to the UEs 115 in connection with aspects of the present disclosure, for example, aspects of FIGS. 3-7, 10, and 11. Instructions 906 may also be referred to as program code, which may be interpreted broadly to include any type of computer-readable statement(s) as discussed above with respect to FIG. 8.

The cross-carrier scheduling module 908 may be implemented via hardware, software, or combinations thereof. For example, the cross-carrier scheduling module 908 may be implemented as a processor, circuit, and/or instructions 906 stored in the memory 904 and executed by the processor 902. In some examples, the cross-carrier scheduling module 908 can be integrated within the modem subsystem 912. For example, the cross-carrier scheduling module 908 can be implemented by a combination of software components (e.g., executed by a DSP or a general processor) and hardware components (e.g., logic gates and circuitry) within the modem subsystem 912.

The cross-carrier scheduling module 908 may be used for various aspects of the present disclosure, for example, aspects of FIGS. 3-7, 10, and 11. In one aspect, the cross-carrier scheduling module 908 is configured to receive, from a BS, such as one of the BSs 105, 405, 800, a first configuration for scheduling in a first cell, the first configuration including at least one of a first monitoring periodicity parameter or a first monitoring offset parameter associated with a search space in a second cell different than the first cell. The cross-carrier scheduling module 908 is further configured to receive, from the BS, a second configuration for scheduling in the second cell, the second configuration including at least one of a second monitoring periodicity parameter or a second monitoring offset parameter associated with the search space in the second cell. In one aspect, the at least one of the second monitoring periodicity parameter or the second monitoring offset parameter is different than the at least one of the first monitoring periodicity or the first monitoring offset. The cross-carrier scheduling module 908 is further configured to monitor, in the search space in the second cell based on the first configuration and the second configuration, for downlink control information (DCI). In some aspects, the cross-carrier scheduling module 908 is further configured to receive, in the first cell based on the monitoring, the DCI comprising a scheduling grant for transmission in the second cell.

As shown, the transceiver 910 may include the modem subsystem 912 and the RF unit 914. The transceiver 910 can be configured to communicate bi-directionally with other devices, such as the BSs 105. The modem subsystem 912 may be configured to modulate and/or encode the data from the memory 904 and/or the cross-carrier scheduling module 908 according to a modulation and coding scheme (MCS), e.g., a low-density parity check (LDPC) coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., UE capability report, MSG1, MSG3, ACK/NACK, PUCCH) from the modem subsystem 912 (on outbound transmissions) or of transmissions originating from another source such as a UE 115 or a BS 105. The RF unit 914 may be further configured to perform analog beamforming in conjunction with the digital beamforming. Although shown as integrated together in transceiver 910, the modem subsystem 912 and the RF unit 914 may be separate devices that are coupled together at the UE 115 to enable the UE 115 to communicate with other devices.

The RF unit 914 may provide the modulated and/or processed data, e.g. data packets (or, more generally, data messages that may include one or more data packets and other information), to the antennas 916 for transmission to one or more other devices. The antennas 916 may further receive data messages transmitted from other devices. The antennas 916 may provide the received data messages for processing and/or demodulation at the transceiver 910. The transceiver 910 may provide the demodulated and decoded data (e.g., PDCCH, PDSCH, RRC configuration, SSB, SIB, PDCCH, search space configurations) to the cross-carrier scheduling module 908 for processing. The antennas 916 may include multiple antennas of similar or different designs in order to sustain multiple transmission links. The RF unit 914 may configure the antennas 916.

In some aspects, the processor 902 is configured to coordinate with the cross-carrier scheduling module 908 to perform DCI monitoring in a scheduling cell having a first SCS using a search space configuration associated with a second SCS of a scheduled cell.

In an aspect, the UE 900 can include multiple transceivers 910 implementing different RATs (e.g., NR and LTE). In an aspect, the UE 900 can include a single transceiver 910 implementing multiple RATs (e.g., NR and LTE). In an aspect, the transceiver 910 can include various components, where different combinations of components can implement different RATs.

Figure 10:
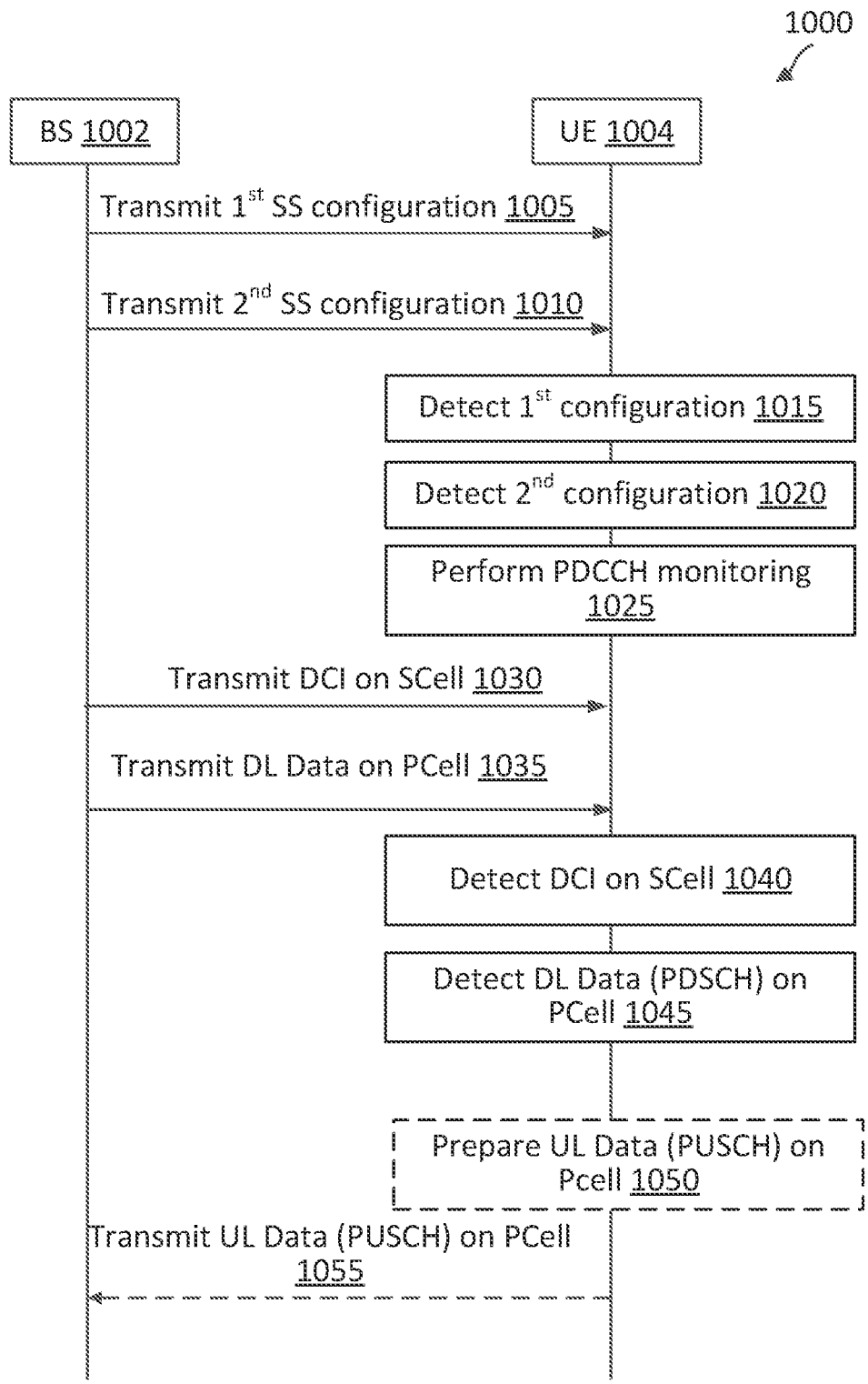
FIG. 10 is a signaling diagram illustrating a control channel monitoring scheme in a cross-carrier scheduling scenario according to some aspects of the present disclosure.

FIG. 10 is a signaling diagram illustrating a cross-carrier scheduling method 1000 according to some aspects of the present disclosure. The method 1000 may be implemented between a BS 1002, a UE 1004. The BS 1002 may correspond to a BS 105, 405, or 800, and the UE may correspond to a UE 115, 415, or 900. In some instances, the UE 1004 may be configured for carrier aggregation (CA) and cross-carrier scheduling between multiple serving cells, including a Pcell and at least one Scell. The method 1000 may be implemented in conjunction with the schemes 300, 400, 500, 600, 700, 1100, and/or 1200 discussed with reference to FIGS. 3, 4, 5, 6, 7, 11, and/or 12, respectively. As illustrated, the method 1000 includes a number of enumerated actions, but embodiments of the method 1000 may include additional actions before, after, and in between the enumerated actions. In some embodiments, one or more of the enumerated actions may be omitted or performed in a different order.

At a high level, to monitor for DCI on different cells associated with different SCSs, the UE 1004 may use different search space configurations on a scheduling cell, based on the SCS of the scheduled cell(s). For example, a first configuration may be used to monitor for DCI on the scheduling cell for cross-carrier scheduling to a scheduled cell associated with a lower SCS, and a different second configuration may be used to monitor for DCI on the scheduling cell for self-scheduling on the scheduling cell, which is associated with a higher SCS. Accordingly, the scheduling cell can use different monitoring parameters, such as slot periodicity and offset, duration, and starting symbol, such that the monitoring occasions correspond to the potential transmissions of DCI for the scheduled cell.

At action 1005, the BS 1002 transmits a first search space configuration to the UE. In some aspects, the first search space configuration may be used for scheduling on a first cell, which may be a Pcell, and may be transmitted to the UE via the first cell or a second cell, which may be an Scell. For instance, the first search space configuration may be used by the UE 1004 to monitor for DCI in a search space within the second cell, where the search space of the second cell is used for scheduling data transmissions on the first cell. The first search space configuration may include or indicate a plurality of parameters for monitoring DCI. For example, the first search space configuration may indicate a slot periodicity and offset, a duration, a staring symbol, or any other suitable parameter. The first search space configuration may include one or more of the parameters in the search space configuration 560. The first search space configuration may be included in an RRC information element or message. In one aspect, the first search space configuration may be a UE-specific search space configuration used for monitoring for DCI in the search space of the Scell, where the DCI in the search space indicates scheduling information for scheduling DL and/or UL data on the Pcell. The Pcell may have a first SCS, and the Scell may have a second SCS higher than the first SCS. In one aspect, the first SCS may be 15 kHz, and the second SCS may be 30 kHz, 120 kHz, or any other suitable SCS value. In some instances, the BS 1002 may utilize one or more components, such as the processor 802, the memory 804, the cross-carrier scheduling module 808, the transceiver 810, the modem 812, and the one or more antennas 816, to perform aspects of action 1005.

At action 1010, the BS 1002 transmits a second search space configuration to the UE. In some aspects, the second search space configuration may be used for scheduling on the second cell, and may be transmitted via the first cell or the second cell. For instance, the second search space configuration may be used by the UE 1004 to monitor for DCI in a search space within the second cell, where the search space is used for scheduling data transmission on the second cell. The second search space configuration may include or indicate a plurality of parameters for monitoring DCI. The second search space configuration may indicate a slot periodicity and offset, a duration, a staring symbol, or any other suitable parameter. For example, the second search space configuration may include one or more of the parameters in the search space configuration 560. The second search space configuration may be included in an RRC information element or message. In one aspect, the second search space configuration may be a UE-specific search space configuration used for monitoring for DCI on an Scell having a first SCS. In some instances, the BS 1002 may utilize one or more components, such as the processor 802, the memory 804, the cross-carrier scheduling module 808, the transceiver 810, the modem 812, and the one or more antennas 816, to perform aspects of action 1010.

In some aspects, the first search space configuration may indicate a search space index 1 referencing the search space in the second cell. The second search space configuration may also indicate a search space index 1 referencing the same search space in the second cell. However, the first search space configuration and the second search space configuration can have different monitoring periodicity parameters and/or different monitoring slot offset parameters as discussed above with respect to FIG. 7.

At action 1015, the UE 1004 detects the first search space configuration. The first search space configuration may be detected on the Pcell or the Scell, in some aspects. Detecting the first search space configuration may include receiving and decoding an RRC information element. The first search space configuration may be associated with an SCS of the Pcell, which may be the scheduled cell in the cross-carrier scheduling scenario. In some instances, the UE 1004 may utilize one or more components, such as the processor 902, the memory 904, the cross-carrier scheduling module 908, the transceiver 910, the modem 912, and the one or more antennas 916, to perform aspects of action 1015.

At action 1020, the UE 1004 detects the second search space configuration. The second search space configuration may be detected on the Pcell or the Scell, in some aspects. Detecting the second search space configuration may include receiving and decoding an RRC information element. The second search space configuration may be associated with an SCS of the Scell, which may be the scheduling cell in the cross-carrier scheduling scenario. In some aspects, the SCS of the Scell may be different from an SCS of the Pcell. For example, the SCS of the Scell may be greater than the SCS of the Pcell. In some instances, the UE 1004 may utilize one or more components, such as the processor 902, the memory 904, the cross-carrier scheduling module 908, the transceiver 910, the modem 912, and the one or more antennas 916, to perform aspects of action 1020.

At action 1025, the UE 1004 performs PDCCH monitoring based on the first search space configuration and the second search space configuration in the search space of the second cell. In some aspects, PDCCH monitoring may include performing blind decoding within search spaces associated with a plurality of monitoring occasions. The parameters of the search spaces, including the periodicity, offset, duration, type, starting symbol, and other parameters, are indicated in the search space configurations. The blind decoding may include attempting to decode a number of PDCCH candidates within a search space based on an aggregation level and a number of candidates per aggregation level indicated in the search space configurations. In some aspects, the UE 1004 may perform DCI monitoring in a common search space and/or one or more UE-specific search spaces. In some aspects, the UE 1004 may perform DCI monitoring in each search as configured by the BS 1002. The first configuration may be associated with the SCS of the scheduled cell, and the second configuration may be associated with the SCS of the scheduling cell. Accordingly, in some aspects, the first and second configuration may allow for separate monitoring periodicity parameter. In some aspects, the UE 1004 may perform DCI monitoring (blind decoding) in the search space within the Scell based on the first search space configuration to search for a PDCCH candidate carrying a scheduling grant for the Pcell. In some aspects, the UE 1004 may perform DCI monitoring (blind decoding) in the search space within the Scell based on the second search space configuration to search for a PDCCH candidate carrying a scheduling grant for the Scell. In some instances, the UE 1004 may utilize one or more components, such as the processor 902, the memory 904, the cross-carrier scheduling module 908, the transceiver 910, the modem 912, and the one or more antennas 916, to perform aspects of action 1025.

At action 1030, the BS 1002 transmits DCI via the Scell. In some aspects, the DCI may include first DCI transmitted in search space within the Scell according to the first search space configuration, and second DCI transmitted in the search space within the Scell according to the second search space configuration. The DCI may include scheduling information for DL and/or UL data on the Pcell and/or Scell. For example, the first DCI may indicate the location of DL data in a PDSCH on the Pcell, or may include a UL grant for UL data in a PUSCH on the Pcell. Further, the second DCI may indicate the location of DL data in a PDSCH on the Scell. In some instances, the BS 1002 may utilize one or more components, such as the processor 802, the memory 804, the cross-carrier scheduling module 808, the transceiver 810, the modem 812, and the one or more antennas 816, to perform aspects of action 1030.

At action 1035, the BS transmits DL data in a PDSCH via the Pcell. The DL data is transmitted according to the scheduling information provided in the DCI (the first DCI) associated with the Pcell and transmitted to the UE 1004 in search space of the Scell according to the first search space configuration. In some instances, the BS 1002 may utilize one or more components, such as the processor 802, the memory 804, the cross-carrier scheduling module 808, the transceiver 810, the modem 812, and the one or more antennas 816, to perform aspects of action 1035.

At action 1040, the UE 1004 detects the DCI on the Scell. Detecting the DCI may include successfully decoding the DCI using the blind decoding process described above with respect to action 1025. In some aspects, as explained above, detecting the DCI on the Scell may include detecting multiple DCIs in PDCCH candidates within the search space of the Scell, where each DCI (e.g., first DCI, second DCI), is associated with scheduling DL and/or UL data on a different scheduled cell. In some instances, the UE 1004 may utilize one or more components, such as the processor 902, the memory 904, the cross-carrier scheduling module 908, the transceiver 910, the modem 912, and the one or more antennas 916, to perform aspects of action 1040.

At action 1045, the UE detects the DL data transmitted in action 1035 via the PDSCH in the Pcell. The DL data may be detected according to scheduling information provided by the DCI in the search space of the Scell. In some instances, the UE 1004 may utilize one or more components, such as the processor 902, the memory 904, the cross-carrier scheduling module 908, the transceiver 910, the modem 912, and the one or more antennas 916, to perform aspects of action 1045.

In action 1050, which may be an optional or alternative action to action 1045, the UE 1004 generates and prepares UL data for transmission in a PUSCH on the Pcell according to a UL grant provided in the DCI detected in action 1040. In some aspects, the Scell, which is the scheduling cell in the illustrated scenario, may not have UL resources. Accordingly, UL transmissions may be scheduled in the Pcell, or in a different Scell other than the scheduling Scell. In some instances, the UE 1004 may utilize one or more components, such as the processor 902, the memory 904, the cross-carrier scheduling module 908, the transceiver 910, the modem 912, and the one or more antennas 916, to perform aspects of action 1050.

In action 1055, which may be an optional action, the UE 1004 transmits the UL data to the BS 1002 in a PUSCH via the Pcell. In some instances, the UE 1004 may utilize one or more components, such as the processor 902, the memory 904, the cross-carrier scheduling module 908, the transceiver 910, the modem 912, and the one or more antennas 916, to perform aspects of action 1055.

Figure 11:
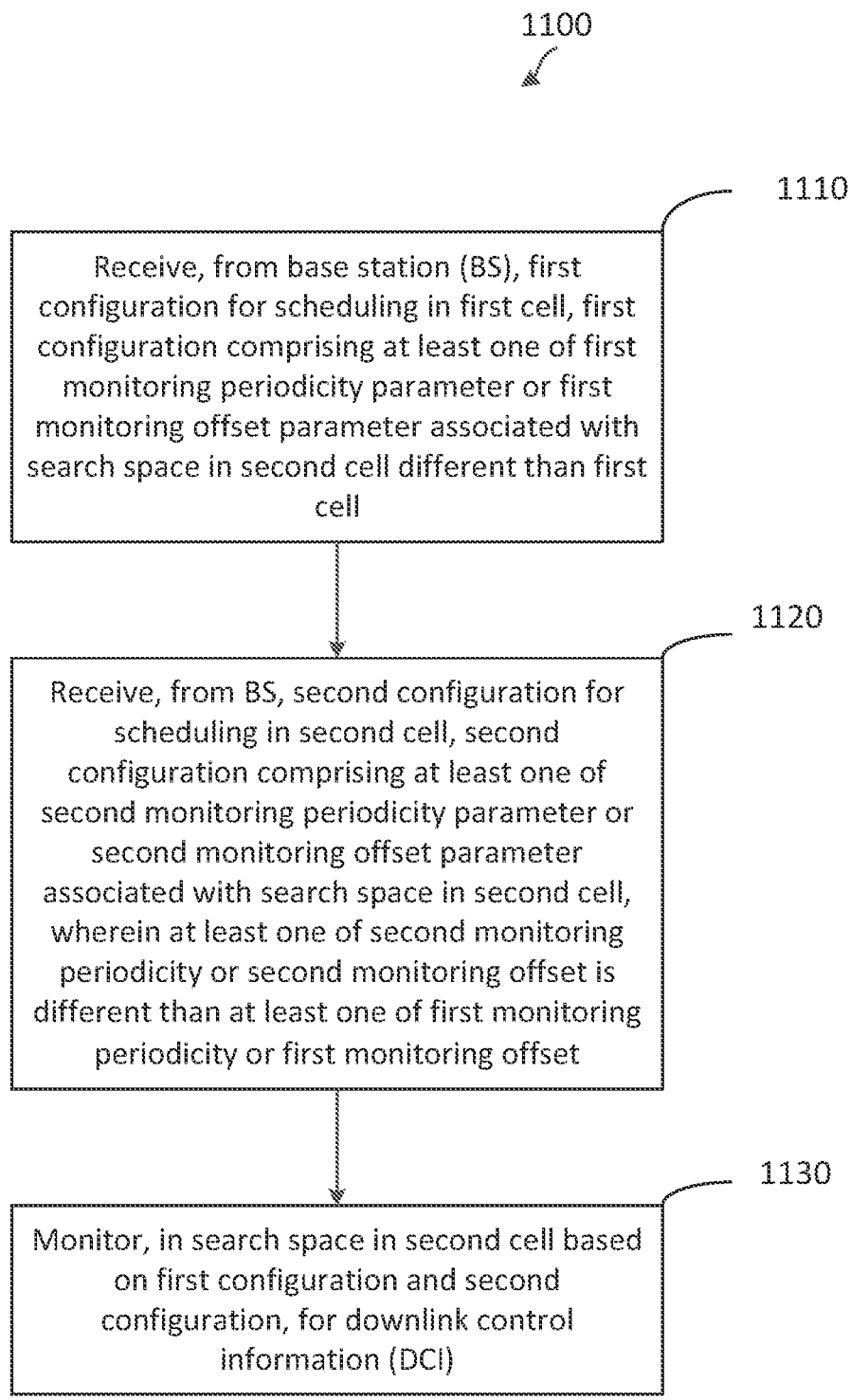
FIG. 11 is a flow diagram of a wireless communication method according to some aspects of the present disclosure.

FIG. 11 is a flow diagram of a wireless communication method 1100 according to some aspects of the present disclosure. Aspects of the method 1100 can be executed by a computing device (e.g., a processor, processing circuit, and/or other suitable component) of a wireless communication device or other suitable means for performing the steps. For example, a wireless communication device, such as the UEs 115, 415, 900, may utilize one or more components, such as the processor 902, the memory 904, the cross-carrier scheduling module 908, the transceiver 910, the modem 912, and the one or more antennas 916, to execute the steps of method 1100. The method 1100 may employ similar mechanisms as described above in FIGS. 3-7 and 10. As illustrated, the method 1100 includes a number of enumerated steps, but aspects of the method 1100 may include additional steps before, after, and in between the enumerated steps. In some aspects, one or more of the enumerated steps may be omitted or performed in a different order.

At block 1110, the UE receives, from the BS, a first configuration for scheduling in a first cell. The first configuration comprises at least one of a first monitoring periodicity parameter or a first monitoring offset parameter associated with a search space in a second cell different than the first cell. In some aspects, the first cell is a primary cell and the second cell is a secondary cell. In some aspects, the first cell is associated with a first subcarrier spacing (SCS) and the second cell is associated with a second SCS different than the first SCS. In some aspects, the first cell and the second cell are associated with a same SCS. In some aspects, the first configuration further comprises an indication of a duration of the search space. In some aspects, the first configuration further comprises an indication of one or more symbols with a slot associated with the search space.

At block 1120, the UE receives, from the BS, a second configuration for scheduling in the second cell, the second configuration comprising at least one of a second monitoring periodicity parameter or a second monitoring offset parameter associated with the search space in the second cell. The at least one of the second monitoring periodicity parameter or the second monitoring offset parameter is different than the at least one of the first monitoring periodicity or the first monitoring offset. In some aspects, the first configuration comprises the first monitoring periodicity parameter, and the second configuration comprises the second monitoring periodicity parameter. In some aspects, the first monitoring periodicity parameter comprises an indication of a number of slots. In some aspects, the first configuration comprises the first monitoring offset parameter, and the second configuration comprises the second monitoring offset parameter. In some aspects, the first monitoring offset parameter comprises an indication of a slot offset relative to a time reference.

At block 1130, the UE monitors, in the search space in the second cell based on the first configuration and the second configuration, for downlink control information (DCI).

In one aspect, the method further includes receiving, in the first cell based on the monitoring, the DCI comprising a scheduling grant for transmission in the second cell.

Figure 12:
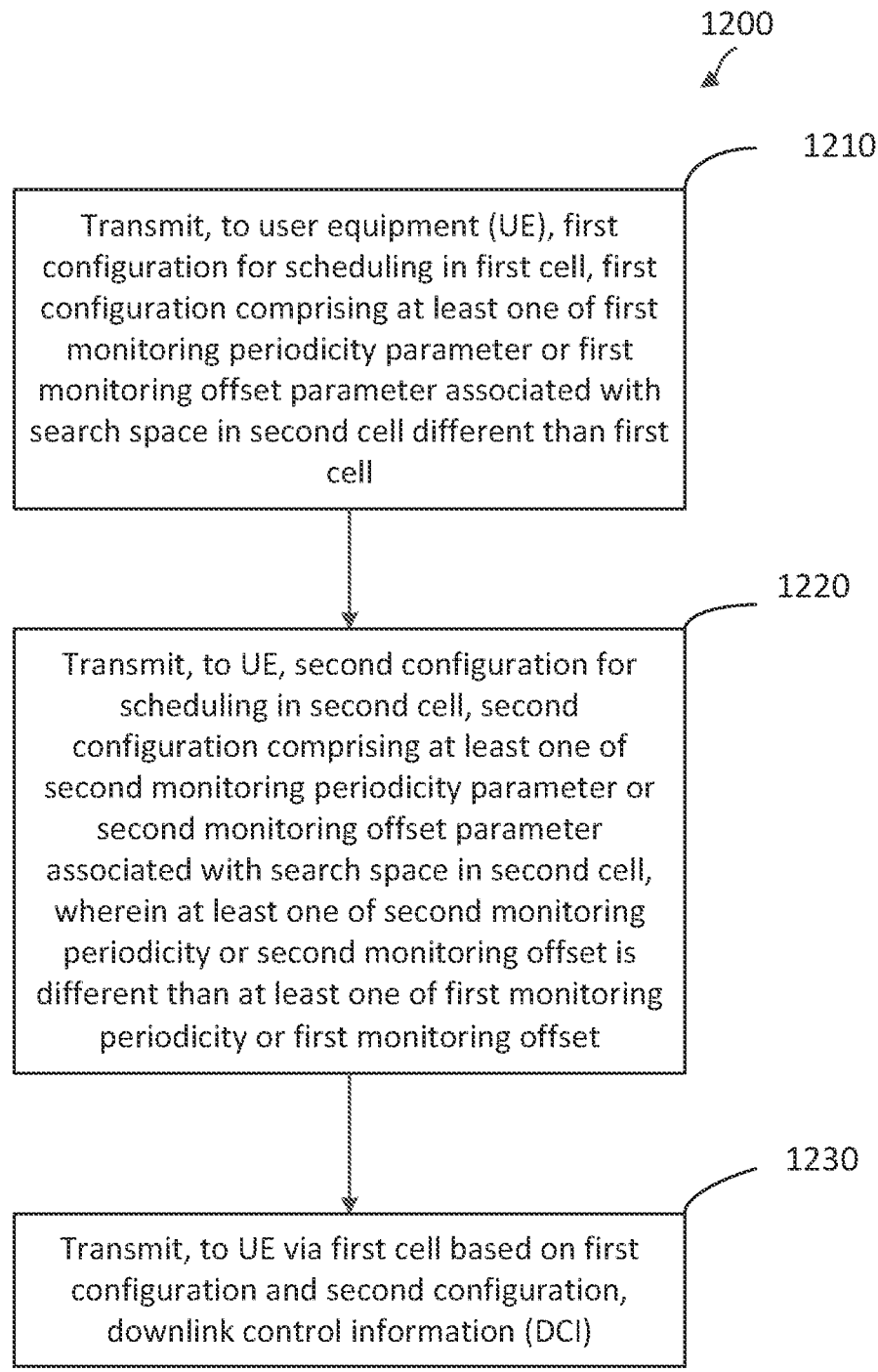
FIG. 12 is a flow diagram of a wireless communication method according to some aspects of the present disclosure.

FIG. 12 is a flow diagram of a wireless communication method 1200 according to some aspects of the present disclosure. Aspects of the method 1200 can be executed by a computing device (e.g., a processor, processing circuit, and/or other suitable component) of a wireless communication device or other suitable means for performing the steps. For example, a wireless communication device, such as the BSs 105, 405, 800, may utilize one or more components, such as the processor 802, the memory 804, the cross-carrier scheduling module 808, the transceiver 810, the modem 812, and the one or more antennas 816, to execute the steps of method 1200. The method 1200 may employ similar mechanisms as described above in FIGS. 3-7, and 10. As illustrated, the method 1200 includes a number of enumerated steps, but aspects of the method 1200 may include additional steps before, after, and in between the enumerated steps. In some aspects, one or more of the enumerated steps may be omitted or performed in a different order.

At block 1210, the BS transmits, to the UE, a first configuration for scheduling in a first cell. The first configuration includes at least one of a first monitoring periodicity parameter or a first monitoring offset parameter associated with a search space in a second cell different than the first cell. In some aspects, the first cell is a primary cell and the second cell is a secondary cell. In some aspects, the first cell is associated with a first subcarrier spacing (SCS) and the second cell is associated with a second SCS different than the first SCS. In some aspects, the first cell and the second cell are associated with a same SCS. In some aspects, the first configuration further comprises an indication of a duration of the search space. In some aspects, the first configuration further comprises an indication of one or more symbols with a slot associated with the search space.

At block 1220, the BS transmits, to the UE, a second configuration for scheduling in the second cell, the second configuration comprising at least one of a second monitoring periodicity parameter or a second monitoring offset parameter associated with the search space in the second cell. The at least one of the second monitoring periodicity parameter or the second monitoring offset parameter is different than the at least one of the first monitoring periodicity parameter or the first monitoring offset parameter. In some aspects, the first configuration comprises the first monitoring periodicity parameter, and the second configuration comprises the second monitoring periodicity parameter. In some aspects, the first monitoring periodicity parameter comprises an indication of a number of slots. In some aspects, the first configuration comprises the first monitoring offset parameter, and the second configuration comprises the second monitoring offset parameter. In some aspects, the first monitoring offset parameter comprises an indication of a slot offset relative to a time reference.

At block 1230, the BS transmits, to the UE via the second cell based on the first configuration and the second configuration, downlink control information (DCI). In some aspects, the DCI comprises a scheduling grant for a transmission in the second cell.

Additional aspects of the present disclosure include the following:

1. A method of wireless communication performed by a user equipment (UE), the method comprising:
   receiving, from a base station (BS), a first configuration for scheduling in a first cell, the first configuration comprising at least one of a first monitoring periodicity parameter or a first monitoring offset parameter associated with a search space in a second cell different than the first cell;
   receiving, from the BS, a second configuration for scheduling in the second cell, the second configuration comprising at least one of a second monitoring periodicity parameter or a second monitoring offset parameter associated with the search space in the second cell, wherein the at least one of the second monitoring periodicity parameter or the second monitoring offset parameter is different than the at least one of the first monitoring periodicity parameter or the first monitoring offset parameter; and
   monitoring, in the search space in the second cell based on the first configuration and the second configuration, for downlink control information (DCI).
2. The method of clause 1, wherein the first cell is a primary cell, and wherein the second cell is a secondary cell.

3. The method of clause 2, wherein the first cell is associated with a first subcarrier spacing (SCS), and wherein the second cell is associated with a second SCS different than the first SCS.
4. The method of clause 2, wherein the first cell and the second cell are associated with a same SCS.
5. The method of any of clauses 1-4, wherein the first configuration comprises the first monitoring periodicity parameter, and wherein the second configuration comprises the second monitoring periodicity parameter.
6. The method of clause 5, wherein the first monitoring periodicity parameter comprises an indication of a number of slots.
7. The method of any of clauses 1-6, wherein the first configuration comprises the first monitoring offset parameter, and wherein the second configuration comprises the second monitoring offset parameter.
8. The method of clause 7, wherein the first monitoring offset parameter comprises an indication of a slot offset relative to a time reference.
9. The method of any of clauses 1-8, wherein the first configuration further comprises an indication of a duration of the search space.
10. The method of any of clauses 1-9, wherein the first configuration further comprises an indication of one or more symbols within a slot associated with the search space.
11. The method of any of clauses 1-10, further comprising:
receiving, in the first cell based on the monitoring, the DCI comprising a scheduling grant for a transmission in the first cell.
12. A method of wireless communication performed by a base station (BS), the method comprising:
transmitting, to a user equipment (UE), a first configuration for scheduling in a first cell, the first configuration comprising at least one of a first monitoring periodicity parameter or a first monitoring offset parameter associated with a search space in a second cell different than the first cell;
transmitting, to the UE, a second configuration for scheduling in the second cell, the second configuration comprising at least one of a second monitoring periodicity parameter or a second monitoring offset parameter associated with the search space in the second cell, wherein the at least one of the second monitoring periodicity parameter or the second monitoring offset parameter is different than the at least one of the first monitoring periodicity parameter or the first monitoring offset parameter; and
transmitting, to the UE via the second cell based on the first configuration and the second configuration, downlink control information (DCI).
13. The method of clause 12, wherein the first cell is a primary cell, and wherein the second cell is a secondary cell.
14. The method of clause 13, wherein the first cell is associated with a first subcarrier spacing (SCS), and wherein the second cell is associated with a second SCS different than the first SCS.
15. The method of clause 13, wherein the first cell and the second cell are associated with a same SCS.
16. The method of any of clauses 12-15, wherein the first configuration comprises the first monitoring periodicity parameter, and wherein the second configuration comprises the second monitoring periodicity parameter.
17. The method of clause 16, wherein the first monitoring periodicity parameter comprises an indication of a number of slots.
18. The method of any of clauses 12-17, wherein the first configuration comprises the first monitoring offset parameter, and wherein the second configuration comprises the second monitoring offset parameter.
19. The method of clause 18, wherein the first monitoring offset parameter comprises an indication of a slot offset relative to a time reference.
20. The method of any of clauses 12-19, wherein the first configuration further comprises an indication of a duration of the search space.
21. The method of any of clauses 12-20, wherein the first configuration further comprises an indication of one or more symbols within a slot associated with the search space.
22. The method of any of clauses 12-21, wherein the DCI comprises a scheduling grant for a transmission in the first cell.
23. A user equipment (UE), comprising:
a transceiver configured to:
receive, from a base station (BS), a first configuration for scheduling in a first cell, the first configuration comprising at least one of a first monitoring periodicity parameter or a first monitoring offset parameter associated with a search space in a second cell different than the first cell; and
receive, from the BS, a second configuration for scheduling in the second cell, the second configuration comprising at least one of a second monitoring periodicity parameter or a second monitoring offset parameter associated with the search space in the second cell, wherein the at least one of the second monitoring periodicity parameter or the second monitoring offset parameter is different than the at least one of the first monitoring periodicity parameter or the first monitoring offset parameter; and
a processor in communication with the transceiver and configured to:
monitor, in the search space in the second cell based on the first configuration and the second configuration, for downlink control information (DCI).
24. The UE of clause 23, wherein the first cell is a primary cell, and wherein the second cell is a secondary cell.
25. The UE of clause 24, wherein the first cell is associated with a first subcarrier spacing (SCS), and wherein the second cell is associated with a second SCS different than the first SCS.
26. The UE of clause 24, wherein the first cell and the second cell are associated with a same SCS.
27. The UE of any of clauses 23-26, wherein the first configuration comprises the first monitoring periodicity parameter, and wherein the second configuration comprises the second monitoring periodicity parameter.
28. The UE of clause 27, wherein the first monitoring periodicity parameter comprises an indication of a number of slots.
29. The UE of any of clauses 23-28, wherein the first configuration comprises the first monitoring offset parameter, and wherein the second configuration comprises the second monitoring offset parameter.
30. The UE of clause 29, wherein the first monitoring offset parameter comprises an indication of a slot offset relative to a time reference.

31. The UE of any of clauses 23-30, wherein the first configuration further comprises an indication of a duration of the search space.
32. The UE of any of clauses 23-31, wherein the first configuration further comprises an indication of one or more symbols within a slot associated with the search space.
33. The UE of any of clauses 23-32, wherein the transceiver is further configured to:
receive, in the first cell based on the monitoring, the DCI comprising a scheduling grant for a transmission in the first cell.
34. A base station (BS), comprising:
a transceiver configured to:
transmit, to a user equipment (UE), a first configuration for scheduling in a first cell, the first configuration comprising at least one of a first monitoring periodicity parameter or a first monitoring offset parameter associated with a search space in a second cell different than the first cell;
transmit, to the UE, a second configuration for scheduling in the second cell, the second configuration comprising at least one of a second monitoring periodicity parameter or a second monitoring offset parameter associated with the search space in the second cell, wherein the at least one of the second monitoring periodicity parameter or the second monitoring offset parameter is different than the at least one of the first monitoring periodicity parameter or the first monitoring offset parameter; and
transmit, to the UE via the second cell based on the first configuration and the second configuration, downlink control information (DCI).
35. The BS of clause 34, wherein the first cell is a primary cell, and wherein the second cell is a secondary cell.
36. The BS of clause 35, wherein the first cell is associated with a first subcarrier spacing (SCS), and wherein the second cell is associated with a second SCS different than the first SCS.
37. The BS of clause 35, wherein the first cell and the second cell are associated with a same SCS.
38. The BS of any of clauses 34-37, wherein the first configuration comprises the first monitoring periodicity parameter, and wherein the second configuration comprises the second monitoring periodicity parameter.
39. The BS of clause 38, wherein the first monitoring periodicity parameter comprises an indication of a number of slots.
40. The BS of any of clauses 34-39, wherein the first configuration comprises the first monitoring offset parameter, and wherein the second configuration comprises the second monitoring offset parameter.
41. The BS of clause 40, wherein the first monitoring offset parameter comprises an indication of a slot offset relative to a time reference.
42. The BS of any of clauses 34-41, wherein the first configuration further comprises an indication of a duration of the search space.
43. The BS of any of clauses 34-42, wherein the first configuration further comprises an indication of one or more symbols within a slot associated with the search space.
44. The BS of any of clauses 34-43, wherein the DCI comprises a scheduling grant for a transmission in the first cell.
45. A non-transitory computer-readable medium having program code recorded thereon, the program code comprising:
code for causing a user equipment (UE) to receive, from a base station (BS), a first configuration for scheduling in a first cell, the first configuration comprising at least one of a first monitoring periodicity parameter or a first monitoring offset parameter associated with a search space in a second cell different than the first cell;
code for causing the UE to receive, from the BS, a second configuration for scheduling in the second cell, the second configuration comprising at least one of a second monitoring periodicity parameter or a second monitoring offset parameter associated with the search space in the second cell, wherein the at least one of the second monitoring periodicity parameter or the second monitoring offset parameter is different than the at least one of the first monitoring periodicity parameter or the first monitoring offset parameter; and
code for causing the UE to monitor, in the search space in the second cell based on the first configuration and the second configuration, for downlink control information (DCI).
46. The non-transitory computer-readable medium of clause 45, wherein the first cell is a primary cell, and wherein the second cell is a secondary cell.
47. The non-transitory computer-readable medium of clause 46, wherein the first cell is associated with a first subcarrier spacing (SCS), and wherein the second cell is associated with a second SCS different than the first SCS.
48. The non-transitory computer-readable medium of clause 46, wherein the first cell and the second cell are associated with a same SCS.
49. The non-transitory computer-readable medium of any of clauses 45-48, wherein the first configuration comprises the first monitoring periodicity parameter, and wherein the second configuration comprises the second monitoring periodicity parameter.
50. The non-transitory computer-readable medium of clause 49, wherein the first monitoring periodicity parameter comprises an indication of a number of slots.
51. The non-transitory computer-readable medium of any of clauses 45-50, wherein the first configuration comprises the first monitoring offset parameter, and wherein the second configuration comprises the second monitoring offset parameter.
52. The non-transitory computer-readable medium of clause 51, wherein the first monitoring offset parameter comprises an indication of a slot offset relative to a time reference.
53. The non-transitory computer-readable medium of any of clauses 45-52, wherein the first configuration further comprises an indication of a duration of the search space.
54. The non-transitory computer-readable medium of any of clauses 45-53, wherein the first configuration further comprises an indication of one or more symbols within a slot associated with the search space.
55. The non-transitory computer-readable medium of any of clauses 45-54, wherein the program code further comprises:
code for causing the UE to receive, in the first cell based on the monitoring, the DCI comprising a scheduling grant for a transmission in the first cell.

56. A non-transitory computer-readable medium having program code stored thereon, the program code comprising:
  code for causing a base station (BS) to transmit, to a user equipment (UE), a first configuration for scheduling in a first cell, the first configuration comprising at least one of a first monitoring periodicity parameter or a first monitoring offset parameter associated with a search space in a second cell different than the first cell;
  code for causing the BS to transmit, to the UE, a second configuration for scheduling in the second cell, the second configuration comprising at least one of a second monitoring periodicity parameter or a second monitoring offset parameter associated with the search space in the second cell, wherein the at least one of the second monitoring periodicity parameter or the second monitoring offset parameter is different than the at least one of the first monitoring periodicity parameter or the first monitoring offset parameter; and
  code for causing the BS to transmit, to the UE via the second cell based on the first configuration and the second configuration, downlink control information (DCI).

57. The non-transitory computer-readable medium of clause 56, wherein the first cell is a primary cell, and wherein the second cell is a secondary cell.

58. The non-transitory computer-readable medium of clause 57, wherein the first cell is associated with a first subcarrier spacing (SCS), and wherein the second cell is associated with a second SCS different than the first SCS.

59. The non-transitory computer-readable medium of clause 57, wherein the first cell and the second cell are associated with a same SCS.

60. The non-transitory computer-readable medium of any of clauses 56-59, wherein the first configuration comprises the first monitoring periodicity parameter, and wherein the second configuration comprises the second monitoring periodicity parameter.

61. The non-transitory computer-readable medium of clause 60, wherein the first monitoring periodicity parameter comprises an indication of a number of slots.

62. The non-transitory computer-readable medium of any of clauses 56-61, wherein the first configuration comprises the first monitoring offset parameter, and wherein the second configuration comprises the second monitoring offset parameter.

63. The non-transitory computer-readable medium of clause 62, wherein the first monitoring offset parameter comprises an indication of a slot offset relative to a time reference.

64. The non-transitory computer-readable medium of any of clauses 56-63, wherein the first configuration further comprises an indication of a duration of the search space.

65. The non-transitory computer-readable medium of any of clauses 56-64, wherein the first configuration further comprises an indication of one or more symbols within a slot associated with the search space.

66. The non-transitory computer-readable medium of any of clauses 56-65, wherein the DCI comprises a scheduling grant for a transmission in the first cell.

67. A user equipment (UE), comprising:
  means for receiving, from a base station (BS), a first configuration for scheduling in a first cell, the first configuration comprising at least one of a first monitoring periodicity parameter or a first monitoring offset parameter associated with a search space in a second cell different than the first cell;
  means for receiving, from the BS, a second configuration for scheduling in the second cell, the second configuration comprising at least one of a second monitoring periodicity parameter or a second monitoring offset parameter associated with the search space in the second cell, wherein the at least one of the second monitoring periodicity parameter or the second monitoring offset parameter is different than the at least one of the first monitoring periodicity parameter or the first monitoring offset parameter; and
  means for monitoring, in the search space in the second cell based on the first configuration and the second configuration, for downlink control information (DCI).

68. The UE of clause 67, wherein the first cell is a primary cell, and wherein the second cell is a secondary cell.

69. The UE of clause 68, wherein the first cell is associated with a first subcarrier spacing (SCS), and wherein the second cell is associated with a second SCS different than the first SCS.

70. The UE of clause 68, wherein the first cell and the second cell are associated with a same SCS.

71. The UE of any of clauses 67-70, wherein the first configuration comprises the first monitoring periodicity parameter, and wherein the second configuration comprises the second monitoring periodicity parameter.

72. The UE of clause 71, wherein the first monitoring periodicity parameter comprises an indication of a number of slots.

73. The UE of any of clauses 67-72, wherein the first configuration comprises the first monitoring offset parameter, and wherein the second configuration comprises the second monitoring offset parameter.

74. The UE of clause 73, wherein the first monitoring offset parameter comprises an indication of a slot offset relative to a time reference.

75. The UE of any of clauses 67-74, wherein the first configuration further comprises an indication of a duration of the search space.

76. The UE of any of clauses 67-75, wherein the first configuration further comprises an indication of one or more symbols within a slot associated with the search space.

77. The UE of any of clauses 67-76, further comprising:
  means for receiving, in the first cell based on the monitoring, the DCI comprising a scheduling grant for a transmission in the first cell.

78. A base station (BS), comprising:
  means for transmitting, to a user equipment (UE), a first configuration for scheduling in a first cell, the first configuration comprising at least one of a first monitoring periodicity parameter or a first monitoring offset parameter associated with a search space in a second cell different than the first cell;
  means for transmitting, to the UE, a second configuration for scheduling in the second cell, the second configuration comprising at least one of a second monitoring periodicity parameter or a second monitoring offset parameter associated with the search space in the second cell, wherein the at least one of the second monitoring periodicity parameter or the second monitoring offset parameter is different than the at least one of the first monitoring periodicity parameter or the first monitoring offset parameter; and means for transmitting, to the UE via the second cell based on the first configuration and the second configuration, downlink control information (DCI).

79. The BS of clause 78, wherein the first cell is a primary cell, and wherein the second cell is a secondary cell.

80. The BS of clause 79, wherein the first cell is associated with a first subcarrier spacing (SCS), and wherein the second cell is associated with a second SCS different than the first SCS.

81. The BS of clause 79, wherein the first cell and the second cell are associated with a same SCS.

82. The BS of any of clauses 78-81, wherein the first configuration comprises the first monitoring periodicity parameter, and wherein the second configuration comprises the second monitoring periodicity parameter.

83. The BS of clause 82, wherein the first monitoring periodicity parameter comprises an indication of a number of slots.

84. The BS of any of clauses 78-83, wherein the first configuration comprises the first monitoring offset parameter, and wherein the second configuration comprises the second monitoring offset parameter.

85. The BS of clause 84, wherein the first monitoring offset parameter comprises an indication of a slot offset relative to a time reference.

86. The BS of any of clauses 78-85, wherein the first configuration further comprises an indication of a duration of the search space.

87. The BS of any of clauses 78-86, wherein the first configuration further comprises an indication of one or more symbols within a slot associated with the search space.

88. The BS of any of clauses 78-87, wherein the DCI comprises a scheduling grant for a transmission in the first cell.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:

receiving, from a base station (BS), a first configuration for scheduling in a first cell, the first configuration comprising a first monitoring parameter associated with a search space in a second cell different than the first cell, wherein the first monitoring parameter is based on a first subcarrier spacing (SCS) associated with the first cell;

receiving, from the BS, a second configuration for scheduling in the second cell, the second configuration comprising a second monitoring parameter associated with the search space in the second cell, wherein the second monitoring parameter is different than the first monitoring parameter, and wherein the second monitoring parameter is based on a second SCS associated with the second cell, the second SCS being different from the first SCS; and monitoring, in the search space in the second cell based on the first monitoring parameter and the second monitoring parameter, for downlink control information (DCI) comprising a scheduling grant for a transmission in the first cell.

2. The method of claim 1, wherein the first cell is a primary cell, and wherein the second cell is a secondary cell.

3. The method of claim 1, wherein the first monitoring parameter comprises a monitoring periodicity parameter, and wherein the second monitoring parameter comprises a monitoring offset parameter.

4. The method of claim 3, wherein the monitoring periodicity parameter comprises an indication of a number of slots.

5. The method of claim 1, wherein the first monitoring parameter comprises a monitoring offset parameter, and wherein the second monitoring parameter comprises monitoring periodicity parameter.

6. The method of claim 5, wherein the monitoring offset parameter comprises an indication of a slot offset relative to a time reference.

7. The method of claim 1, wherein the first configuration further comprises at least one of:

an indication of a duration of the search space; or an indication of one or more symbols within a slot associated with the search space.

8. The method of claim 1, further comprising: receiving, in the first cell based on the monitoring, the DCI.

9. A method of wireless communication performed by a base station (B S), the method comprising:
transmitting, to a user equipment (UE), a first configuration for scheduling in a first cell, the first configuration comprising a first monitoring parameter associated with a search space in a second cell different than the first cell, wherein the first monitoring parameter is based on a first subcarrier spacing (SCS) associated with the first cell;
transmitting, to the UE, a second configuration for scheduling in the second cell, the second configuration comprising a second monitoring parameter associated with the search space in the second cell, wherein the second monitoring parameter is different than the first monitoring parameter, and wherein the second monitoring parameter is based on a second SCS associated with the second cell, the second SCS being different from the first SCS; and
transmitting, to the UE via the second cell based on the first monitoring parameter and monitoring parameter, downlink control information (DCI) comprising a scheduling grant for a transmission in the first cell.

10. The method of claim 9, wherein the first cell is a primary cell, and wherein the second cell is a secondary cell.

11. The method of claim 9, wherein the first monitoring parameter comprises a monitoring parameter, and wherein the second monitoring parameter comprises a monitoring offset parameter.

12. The method of claim 9, wherein the first monitoring parameter comprises a monitoring offset parameter, and wherein the second monitoring parameter comprises monitoring periodically parameter, and wherein the monitoring offset parameter comprises an indication of a slot offset relative to a time reference.

13. The method of claim 9, wherein the first configuration further comprises at least one of:
an indication of a duration of the search space; or
an indication of one or more symbols within a slot associated with the search space.

14. A user equipment (UE), comprising:
a transceiver configured to:
receive, from a base station (BS), a first configuration for scheduling in a first cell, the first configuration comprising a first monitoring parameter associated with a search space in a second cell different than the first cell, wherein the first monitoring parameter is based on a first subcarrier spacing (SCS) associated with the first cell; and
receive, from the BS, a second configuration for scheduling in the second cell, the second configuration comprising a second monitoring parameter associated with the search space in the second cell, wherein the second monitoring parameter is different than the first monitoring parameter, and wherein the second monitoring parameter is based on a second SCS associated with the second cell, the second SCS being different from the first SCS; and
a processor in communication with the transceiver and configured to:
monitor, in the search space in the second cell based on the first monitoring parameter and the second monitoring parameter, for downlink control information (DCI) comprising a scheduling grant for a transmission in the first cell.

15. The UE of claim 14, wherein the first cell is a primary cell, and wherein the second cell is a secondary cell.

16. The UE of claim 14, wherein the first monitoring parameter comprises a monitoring periodicity parameter, and wherein the second monitoring parameter comprises a monitoring offset parameter.

17. The UE of claim 16, wherein the monitoring periodicity parameter comprises an indication of a number of slots.

18. The UE of claim 14, wherein the first monitoring parameter comprises a monitoring offset parameter, and wherein the second monitoring parameter comprises monitoring periodicity parameter.

19. The UE of claim 18, wherein the monitoring offset parameter comprises an indication of a slot offset relative to a time reference.

20. The UE of claim 14, wherein the first configuration further comprises at least one of:
an indication of a duration of the search space; or
an indication of one or more symbols within a slot associated with the search space.

21. A base station (B S), comprising:
a transceiver configured to:
transmit, to a user equipment (UE), a first configuration for scheduling in a first cell, the first configuration comprising a first monitoring parameter associated with a search space in a second cell different than the first cell, wherein the first monitoring parameter is based on a first subcarrier spacing (SCS) associated with the first cell;
transmit, to the UE, a second configuration for scheduling in the second cell, the second configuration comprising a second monitoring parameter associated with the search space in the second cell, wherein the second monitoring parameter is different than the first monitoring parameter, and wherein the second monitoring parameter is based on a second SCS associated with the second cell, the second SCS being different from the first SCS; and
transmit, to the UE via the second cell based on the first monitoring parameter and the second monitoring parameter, downlink control information (DCI) comprising a scheduling grant for a transmission in the first cell.

22. The BS of claim 21, wherein the first cell is a primary cell, and wherein the second cell is a secondary cell.

23. The BS of claim 21, wherein the first monitoring parameter comprises a monitoring periodicity parameter, and wherein the second monitoring parameter comprises a monitoring offset parameter.

24. The BS of claim 21, wherein the first monitoring parameter comprises a monitoring offset parameter, and wherein the second monitoring parameter comprises monitoring periodicity parameter, and wherein the monitoring offset parameter comprises an indication of a slot offset relative to a time reference.

25. The BS of claim 21, wherein the first configuration further comprises at least one of:
an indication of a duration of the search space; or
an indication of one or more symbols within a slot associated with the search space.

* * * * *